(12) United States Patent
Murakami et al.

(10) Patent No.: US 7,889,130 B2
(45) Date of Patent: Feb. 15, 2011

(54) MULTI-ANTENNA TRANSMITTING APPARATUS AND RETRANSMITTAL METHOD OF MULTI-ANTENNA TRANSMITTING APPARATUS

(75) Inventors: Yutaka Murakami, Kanagawa (JP); Kiyotaka Kobayashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 192 days.

(21) Appl. No.: 11/813,642

(22) PCT Filed: Nov. 25, 2005

(86) PCT No.: PCT/JP2005/021670

§ 371 (c)(1),
(2), (4) Date: Jul. 10, 2007

(87) PCT Pub. No.: WO2006/075453

PCT Pub. Date: Jul. 20, 2006

(65) Prior Publication Data

US 2009/0046008 A1    Feb. 19, 2009

(30) Foreign Application Priority Data

Jan. 14, 2005  (JP) .............................. 2005-008304

(51) Int. Cl.
*H01Q 3/00* (2006.01)
*H04B 7/02* (2006.01)
*H04L 1/16* (2006.01)

(52) U.S. Cl. ...................................... 342/377; 375/267

(58) Field of Classification Search ................ 375/267, 375/260; 342/373, 377
See application file for complete search history.

(56) References Cited

U.S. PATENT DOCUMENTS

| 6,363,425 | B1 | 3/2002 | Höök |
| 6,888,809 | B1 | 5/2005 | Foschini et al. |
| 6,927,728 | B2 * | 8/2005 | Vook et al. .................. 342/377 |
| 7,099,298 | B2 * | 8/2006 | Kim .......................... 370/342 |
| 7,453,948 | B2 * | 11/2008 | Kim et al. ................... 375/267 |

(Continued)

FOREIGN PATENT DOCUMENTS

JP    2001237751    8/2001

(Continued)

OTHER PUBLICATIONS

PCT International Search Report dated Feb. 28, 2006.

(Continued)

*Primary Examiner*—Thomas H Tarcza
*Assistant Examiner*—Cassi Galt
(74) *Attorney, Agent, or Firm*—Dickinson Wright PLLC

(57) ABSTRACT

A multi-antenna transmitting apparatus wherein a relatively simple selection procedure can be used to reconcile the data transmission rate and the received data quality. When a transport signal, which is required to have a higher quality than other signals, is to be transmitted, a vector multiplexing part (105) reduces the number of transport beams (i.e., reduces the number of unique paths used for transmission), and further gives a higher priority to a unique vector belonging to a large unique value and uses that unique vector to vector multiplex the transport signal, thereby forming a transport beam (i.e., gives a higher priority to a signal, which is required to have a high quality, and transmits that signal by use of a unique path having a large path gain).

6 Claims, 18 Drawing Sheets

U.S. PATENT DOCUMENTS

| | | | |
|---|---|---|---|
| 7,567,583 B2* | 7/2009 | Miyoshi | 370/465 |
| 7,702,025 B2* | 4/2010 | Sudo | 375/261 |
| 2002/0106989 A1* | 8/2002 | Aizawa et al. | 455/67.1 |
| 2002/0191535 A1 | 12/2002 | Sugiyama et al. | |
| 2003/0048856 A1 | 3/2003 | Ketchum | |
| 2003/0072285 A1* | 4/2003 | Onggosanusi et al. | 370/335 |
| 2003/0112880 A1 | 6/2003 | Walton | |
| 2004/0179627 A1* | 9/2004 | Ketchum et al. | 375/267 |
| 2005/0249180 A1 | 11/2005 | Murakami | |
| 2006/0056534 A1* | 3/2006 | Ionescu et al. | 375/267 |
| 2006/0104340 A1* | 5/2006 | Walton et al. | 375/227 |
| 2006/0104381 A1* | 5/2006 | Menon et al. | 375/267 |
| 2007/0140377 A1* | 6/2007 | Murakami et al. | 375/299 |

FOREIGN PATENT DOCUMENTS

| | | |
|---|---|---|
| JP | 2001-513597 | 9/2001 |
| JP | 2002374224 | 12/2002 |
| JP | 2003-258770 | 9/2003 |
| JP | 2004-040232 | 2/2004 |
| JP | 2004-120730 | 4/2004 |
| JP | 2004-172981 | 6/2004 |
| JP | 2004-535105 | 11/2004 |
| WO | 2004-077778 | 9/2004 |
| WO | 2004/086712 | 10/2004 |

OTHER PUBLICATIONS

A. Taira, et al.; "A Throughput Enhancement for MIMO-OFDM Systems using Transmission Channel Control and Adaptive Modulation," Technical Report of IEICE DSP2003-168, ST2003-165, RCS2003-263, Jan. 2004, pp. 115-120.

Japanese Office Action dated Oct. 27, 2009.

Y. Namkamura, et al., "MIMO-OFDM ni okeru Channel oyobi Shuhasu Offset no Suitei - Estimation Channel and Frequency Offset in a MIMO-OFDM System," IEICE Technical Report, vol. 104, No. 258, Aug. 2004, pp. 79-84.

* cited by examiner

|  | CHANNEL A | CHANNEL B |
|---|---|---|
| SETTING #1 | BPSK | — |
| SETTING #2 | QPSK | — |
| SETTING #3 | 16QAM | — |
| SETTING #4 | 64QAM | — |
| SETTING #5 | BPSK | BPSK |
| SETTING #6 | QPSK | BPSK |
| SETTING #7 | 16QAM | BPSK |
| SETTING #8 | 64QAM | BPSK |
| SETTING #9 | QPSK | QPSK |
| SETTING #10 | 16QAM | QPSK |
| SETTING #11 | 64QAM | QPSK |
| SETTING #12 | 16QAM | 16QAM |
| SETTING #13 | 64QAM | 16QAM |
| SETTING #14 | 64QAM | 64QAM |

FIG. 11

| APPLICATION | TRANSMISSION MODE | MAXIMUM DELAY TIME | RETRANSMISSION DELAY TIME |
| --- | --- | --- | --- |
| MOVING IMAGE MODE | HIGH-SPEED TRANSMISSION MODE | 0sec | 0 |
| INTERNET MODE | QUALITY PRIORITY MODE | 5sec | 5 |
| FILE DOWNLOAD MODE | HIGH-SPEED TRANSMISSION MODE | 1sec | 5 |
| GAME MODE | QUALITY PRIORITY MODE | 0.1sec | 2 |
| TRAINING MODE | TRAINING MODE | p(sec) | q |
| USER SETTING MODE | USER SETTING MODE | r(sec) | s |

FIG. 17

MULTI-ANTENNA TRANSMITTING APPARATUS AND RETRANSMITTAL METHOD OF MULTI-ANTENNA TRANSMITTING APPARATUS

TECHNICAL FIELD

The present invention relates to a multi-antenna transmitting apparatus and retransmission method there of used in a MIMO (Multiple-Input Multiple-Output) communication system, for example.

BACKGROUND ART

In the related art, a technique is proposed such as a MIMO (Multiple-Input Multiple-Output) communication system where data transmission rate is increased by transmitting different modulated signals at the same time from a plurality of antennas on a transmitting apparatus side and then demultiplexing the modulated signals mixed on the channel on the receiving apparatus side.

A configuration example of this type of communication system is shown in FIG. 1. Multi-antenna transmitting apparatus 20 inputs digital transmission signals 1A to 1D for channels A to D to modulated signal generating sections 2A to 2D. Modulated signal generating sections 1A to 1D then form modulated signals 3A to 3D for channels A to D by performing modulation processing such as BPSK (Binary Phase Shift Keying), QPSK (Quadrature Phase Shift Keying) and 16QAM (Quadrature Amplitude Modulation) on transmission signals 1A to 1D and transmits the signals to radio sections 4A to 4D. Radio sections 4A to 4D form transmission signals 5A to 5D for channels A to D of radio bands by performing predetermined radio processing such as frequency conversion on baseband modulated signals 3A to 3D and outputs transmission signals 5A to 5D to antennas 6A to 6D.

Multi-antenna receiving apparatus 30 receives the signals mixed on the channel after transmitted by the plurality of antennas 6A to 6D of multi-antenna transmitting apparatus 20. Multi-antenna receiving apparatus 30 receives signals mixed on the channel using antennas 7_1 to 7_4. Received signals 8_1 to 8_4 received by antennas 7_1 to 7_4 are inputted to radio sections 9_1 to 9_4. Radio sections 9_1 to 9_4 then obtain baseband signals 10_1 to 10_4 from received signals 8_1 to 8_4 for the radio band by performing predetermined radio processing such as frequency conversion on received signals 8_1 to 8_4 and output baseband signals 10_1 to 10_4 to demultiplexing/demodulating section 11. Demultiplexing/demodulating section 11 obtains a spatial correlation matrix between transmit antennas 6A to 6D and receive antennas 7_1 to 7_4 based on, for example, a known preamble inserted within modulated signals 3A to 3D, demultiplexes and extracts signals corresponding to modulated signals 3A to 3D using an inverse of this matrix, and demodulates demultiplexed and extracted the signals corresponding to modulated signals 3A to 3D so as to obtain digital received signals 12A to 12D corresponding to digital transmission signals 1A to 1D.

Further, in the related art, many techniques have been proposed to increase a data transmission rate in a multi-antenna communication system. For example, in non-patent document 1, a technique is proposed for increasing a data transmission rate by appropriately switching the number of transmission signals and the modulation schemes at modulated signal generating sections 2A to 2D.

Non-patent document 1: "A Throughput Enhancement for MIMO-OFDM Systems using Transmission Channel Control and Adaptive Modulation" Institute of Electronics, Information and Communication Engineers, technical report RCS-2003-263, January 2004.

DISCLOSURE OF INVENTION

Problems to be Solved by the Invention

However, as disclosed in non-patent document 1, using the technology of switching the number of transmission signals and the modulation schemes, the number of choices of selecting the transmission method increases, and the procedure for selecting the transmission method therefore becomes complicated. For example, consider the case where modulated signal generating sections 2A to 2D can select one of the modulation schemes of QPSK and 16QAM, and where it is possible to make one, two, three or four of the modulated signal generating sections 2A to 2D operate to select the number of transmission signals. In this case, as for the modulation scheme, data errors can be obviously reduced more when QPSK is selected rather than 16QAM and when BPSK is selected rather than QPSK. Interference between transmission signals on the channel is reduced more when the number of transmission signals is three rather than four, two rather than three and one rather than two. Therefore, it is possible to improve received quality. However, a data transmission rate decreases when modulation schemes having a smaller M-ary number are selected, and in accordance with a decrease in the number of transmission signals.

Namely, when the number of transmission signals and the modulation schemes are switched as in non-patent document 1, it is necessary to select which combinations of modulation schemes and the number of transmission signals are the best for minimizing the decrease in a data transmission rate and improving the received quality, and this selection procedure is complicated.

It is therefore an object of the present invention to provide a multi-antenna transmitting apparatus and a retransmission method for the multi-antenna transmitting apparatus capable of improving both a data transmission rate and received data quality by using a comparatively simple selection procedure.

Means for Solving the Problem

In order to achieve this object, the multi-antenna transmitting apparatus of the present invention adopts a configuration including: a multiplexed frame generating section that forms transmission signals corresponding to a plurality of channels performing multiplex transmission at the same time; a vector multiplexing section that forms a transmission beam by vector multiplexing the transmission signals for a plurality of channels using eigen vectors belonging to eigen values of a spatial correlation matrix between a plurality of transmit and receive antennas and supplying the transmission signals to the plurality of antennas; and a beam control section that controls the vector multiplexing section so that, when transmission signals requiring higher quality compared to other signals are transmitted, the transmission beam is formed by reducing the number of transmission beams and vector multiplexing the transmission signals preferentially using eigen vectors belonging to large eigen values.

Further, in the multi-antenna transmitting apparatus of the present invention, the transmission signal requiring higher quality compared to the other signals is a preamble or a control information symbol.

Moreover, the multi-antenna transmitting apparatus of the present invention adopts a configuration wherein: the transmission signal requiring higher quality compared to the other signals is a retransmission signal; and the beam control section controls the vector multiplexing section so that, when the retransmission signal is transmitted, the number of transmission beams is reduced compared to the previous transmission, and the retransmission signal is vector multiplexed using an eigen vector belonging to a larger eigen value than the previous transmission.

Further, a retransmission method of the multi-antenna transmitting apparatus of the present invention, includes when a retransmission signal is transmitted, reducing the number of transmission beams compared to the previous transmission and transmitting the retransmission signal using a transmission beam vector multiplexed using an eigen vector belonging to a larger eigen value than the previous transmission.

ADVANTAGEOUS EFFECT OF THE INVENTION

According to the present invention, it is possible to implement a multi-antenna transmitting apparatus and a retransmission method for the multi-antenna transmitting apparatus capable of improving both a data transmission rate and received data quality by using a comparatively simple selection procedure.

BRIEF DESCRIPTION OF THE DRAWINGS

FIG. 11 shows a modulation scheme table of Embodiment 3;

FIG. 17 shows an example of a table different from the modulation scheme table of Embodiment 3.

BEST MODE FOR CARRYING OUT THE INVENTION

Figure 1:
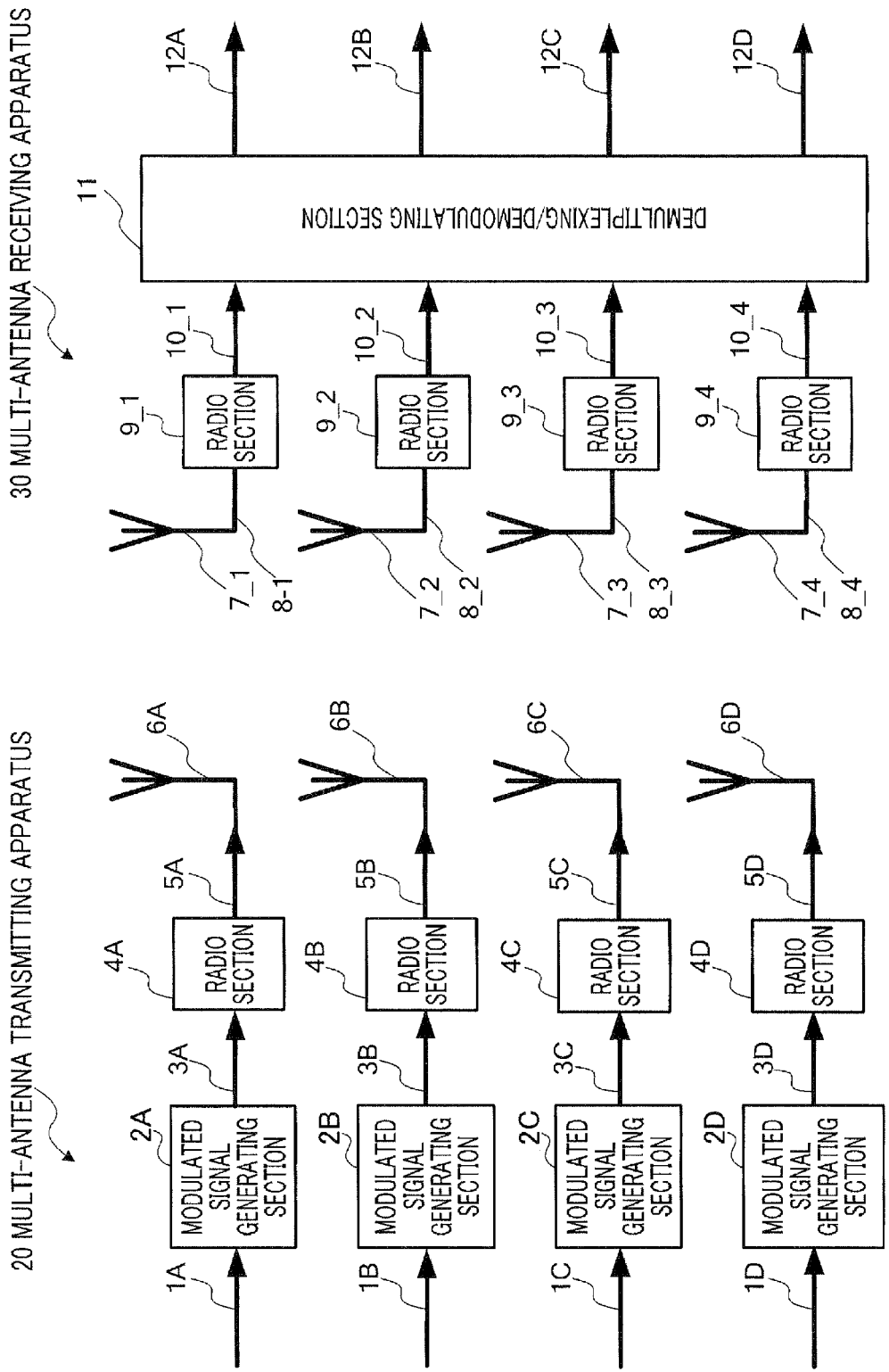
FIG. 1 is a block diagram showing a configuration of a MIMO communication system of the related art.

The inventors of the present invention achieve the present invention with an idea where, by assigning weights and combining transmission signals for a plurality of channels using weights corresponding to eigen vectors belonging to eigen values of a space correlation matrix between a plurality of transmit and receive antennas and providing the results to a plurality of antennas, at the multi-antenna transmitting apparatus (that is, a multi-antenna transmitting apparatus transmitting beams using an eigenmode) forming a plurality of transmission beams, it is possible to improve both a data transmission rate and received data quality with a comparatively simple selection procedure by positively using the magnitude of the eigen value.

The gist of the present invention is that, when transmission signals requiring higher quality compared to other signals are transmitted, a transmission beam is formed by reducing the number of transmission beams and vector multiplexing the transmission signals requiring high quality preferentially using eigen vectors belonging to large eigen values.

Before describing the details of the embodiments of the present invention, an eigenmode used in the present invention will be simply described.

In a MIMO system, a communication method can be implemented where, when channel state information (CSI: Channel State Information) is known not just at a receiving station but also at a transmitting station, the transmitting station transmits the signal subjected to vector conversion using a transmitting channel signature vector to the receiving station using a transmit array antenna, and the receiving station detects and demodulates the transmission signal using a receiving channel signature vector corresponding to the transmitting channel signature vector from the received signal of the receive array antenna.

In particular, as a communication mode of forming a plurality of channels in communication space and multiplex transmitting signals at the same time, there is an eigenmode utilizing a singular vector or an eigen vector belonging to eigen values of a channel matrix (a space correlation matrix between a plurality of transmit and receive antennas, in other words, a matrix taking complex channel coefficients of combinations of all or some of antenna elements of a transmit array antenna and antenna elements of a receive array antenna as elements). In this embodiment, the above-described singular vectors and eigen vectors are collectively referred to as eigen vectors. This eigenmode is a method of utilizing eigen vectors as the above-described channel signature vectors. If this eigenmode is used, channels multiplexed at the same time in communication space can then be regarded as independent paths.

The feature of the eigenmode is that a channel capacity of a MIMO system can be made maximum, particularly when radio channels of a MIMO system are handled as a narrow band flat fading process. For example, in a radio communication system adopting OFDM, it is typical to insert guard intervals in order to eliminate inference between symbols due to multipath delay waves, and design so that OFDM subcarriers are in a flat fading process. Therefore, when OFDM signals are transmitted in a MIMO system, by using the eigenmode, it is possible to multiplex and transmit a plurality of signals in space using, for example, subcarriers.

As a method for a transmitting station (assuming a base station) to acquire channel state information for a downlink, in TDD utilizing the same frequency carriers for uplink and downlink, it is possible to estimate or measure channel state information at the transmitting station using uplink from a receiving station (assuming a terminal) using reciprocity of channels. On the other hand, in FDD utilizing different frequency carriers for uplink and downlink, it is also possible to estimate or measure channel state information for a downlink at a receiving station and obtain accurate CSI for the downlink at the transmitting station by reporting these results to the transmitting station.

As a communication method utilizing a MIMO system, several methods are proposed where channel state information for radio channels is known at the receiving station, as contrasted with the eigen mode where channel state information for a downlink is known at the transmitting station and the receiving station. For example, BLAST is well known as a method of having the same purpose as eigenvalues, that is, multiplexing and transmitting signals spatially. Further, as a method of sacrificing the degree of multiplexing, that is, a method for obtaining spatial diversity effects of antennas not for increasing a capacity, for example, transmission diversity using a space-time code is well known. An eigenmode is a beam space mode where signals are subjected to vector conversion at a transmit array antenna and transmitted, in other words, signals are mapped to a beam space and transmitted. On the other hand, in BLAST and transmission diversity, signals are mapped to antenna elements, and therefore BLAST and transmission diversity can be referred to as antenna element modes.

Embodiments of the present invention will be described in detail below with reference to the accompanying drawings.

Embodiment 1

Figure 2:
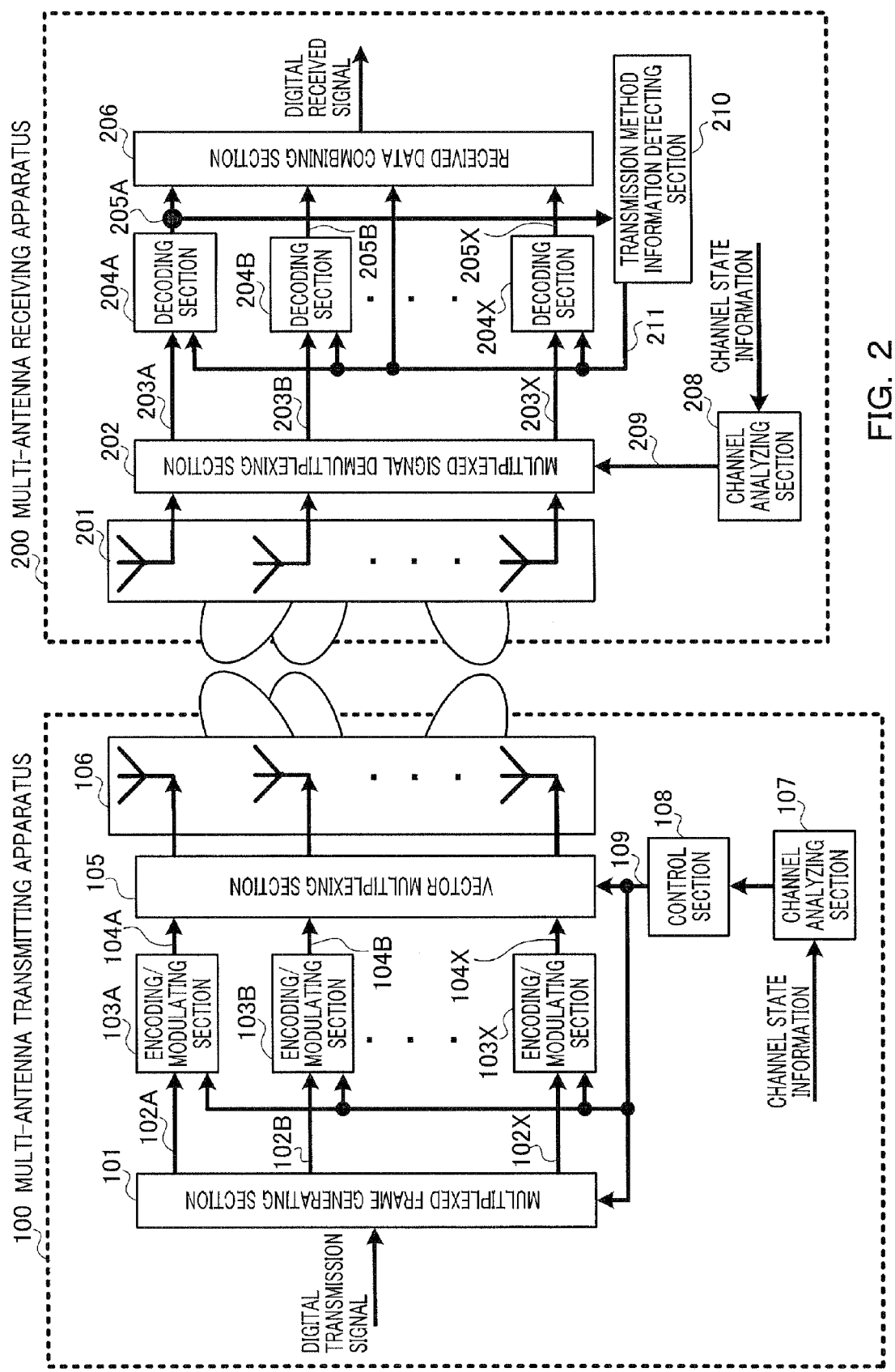
FIG. 2 is a block diagram showing a configuration of a multi-antenna transmitting apparatus and a multi-antenna receiving apparatus according to Embodiment 1 of the present invention.

FIG. 2 shows a configuration of the multi-antenna transmitting apparatus and the multi-antenna receiving apparatus according to Embodiment 1 of the present invention. In this embodiment, the case will be described as an example where multi-antenna transmitting apparatus 100 is provided at a base station, and multi-antenna receiving apparatus 200 is provided at a terminal.

Multi-antenna transmitting apparatus 100 and multi-antenna receiving apparatus 200 configure a MIMO (Multiple-Input Multiple-Output) system and carry out channel multiplexing communication using a beam space mode typified by the eigenmode.

Multi-antenna transmitting apparatus 100 has channel analyzing section 107. Channel analyzing section 107 obtains a channel matrix (space correlation matrix) between a plurality of transmit and receive antennas based on channel state information which is the estimation results of channels between a plurality of transmit and receive antennas of multi-antenna transmitting apparatus 100 and multi-antenna receiving apparatus 200, and obtains eigen values (for example, $\lambda_A$, $\lambda_B$, $\lambda_C$, ..., $\lambda_X$) for the channel matrix by analyzing a singular value (SVD (Singular Value Decomposition)) of this channel matrix. Here, the eigen value for this channel matrix may also indicate path gain of the eigen path (for example, path A, path B, path C, ..., path X) for each channel. Further, channel analyzing section 107 calculates channel signature vectors (in the case of this embodiment, eigen vectors) for the plurality of transmission channels based on the channel state information in order to form multiplexed channels. Channel analyzing section 107 transmits the obtained eigen values and channel signature vectors (eigen vectors) to control section 108.

Control section 108 as a beam control section refers to the order of magnitude of the eigen values and forms control signal 109 for controlling multiplexed frame generating section 101, encoding/modulating sections 103A to 103X and vector multiplexing section 105. In reality, as control signal 109, control section 108 transmits a signal for controlling a multiplexed frame configuration to multiplexed frame generating section 101, a signal for controlling the coding rate and modulation scheme to encoding/modulating sections 103A to 103X, and transmits channel signature vectors (eigen vectors) for use in vector multiplexing to vector multiplexing section 105.

Multi-antenna transmitting apparatus 100 inputs a digital transmission signal and control signal 109 to multiplexed frame generating section 101. Multiplexed frame generating section 101 forms digital transmission signal 102A for channel A, digital transmission signal 102B for channel B, ..., digital transmission signal 102 for channel X as a plurality of transmission frames for mapping to multiplexed channels and transmits these signals to encoding/modulating sections 103A to 103X.

Encoding/modulating sections 103A to 103X decide coding rates and modulation schemes based on control signal 109, acquire baseband signal 104A for channel A to baseband signal 104X for channel X by carrying out encoding and modulation using the coding rates and modulation schemes, and transmit these signals to vector multiplexing section 105.

Vector multiplexing section 105 vector multiplexes baseband signals 104A to 104X by individually multiplying and adding channel signature vectors with baseband signals 104A to 104X for channels A to X based on control signal 109 and supplies the vector multiplexed signals to transmit array antenna 106. In other words, vector multiplexing section 105 vector multiplexes transmission signals for a plurality of channels using eigen vectors belonging to eigen values of a spatial correlation matrix between a plurality of transmit and receive antennas and forms a transmission beam (signal for eigen path) by supplying this to a plurality of antennas.

In this way, multi-antenna transmitting apparatus 100 carries out transmission for multi-antenna receiving apparatus 200 in the eigenmode.

Next, the configuration of multi-antenna receiving apparatus 200 will be described. Multi-antenna receiving apparatus 200 has channel analyzing section 200. Channel analyzing section 208 calculates a plurality of channel signature vectors 209 for demultiplexing the multiplexed transmission signals based on channel state information which is the estimation results of channels between a plurality of transmit and receive antennas and transmits the results to multiplexed signal demultiplexing section 202.

Multiplexed signal demultiplexing section 202 acquires received signals 203A to 203X for channels A to X by multiplying channel signature vectors with received signals received at receive array antenna 201 and transmits received signals 203A to 203X to decoding sections 204A to 204X.

Decoding sections 204A to 204X acquire digital signals 205A to 205X for channels A to X by decoding received signals 203A to 203X for channels A to X based on transmission method information (information of the modulation scheme and coding rate) 211 and transmit digital signals 205A to 205X to received data combining section 206.

Here, transmission method information 211 is extracted from digital signal 205A for channel A by transmission method information detecting section 210. In addition to information of the modulation scheme and the coding rate, transmission method information 211 includes information of multiplexed frames.

Received data combining section 206 receives digital signals 205A to 205X for channels A to X as input and obtains digital received signal by combining digital signals 205A to 205X based on transmission method information (information of multiplexed frames) 211.

In addition to this configuration, multi-antenna transmitting apparatus 100 vector multiplexes signals that require higher quality compared to other signals preferentially using eigen vectors belonging to large eigen values. As a result, it is possible to make power of eigen paths (that may also be referred to as transmission beams) for signals requiring higher quality larger, so that it is possible to improve received data quality of these signals. Amplitude gain (path gain) of eigen paths of eigen value $\lambda$ then becomes $\sqrt{\lambda}$.

Further, multi-antenna transmitting apparatus 100 does not transmit other signals while signals requiring high quality compared to other signals are transmitted. Namely, other signals are not transmitted using other eigen paths when signals requiring high quality are transmitted using an eigen path having large path gain. As a result, interference between eigen paths disappears, so that it is possible to further improve received data quality of signals requiring high quality.

Namely, at multi-antenna transmitting apparatus 100 of this embodiment, when transmission signals requiring high quality compared to other signals are transmitted, a transmission beam is formed by reducing the number of transmission beams (reducing the number of eigen paths used for transmission) and vector multiplexing the transmission signals preferentially using eigen vectors belonging to large eigen values (that is, preferentially transmitting signals requiring high quality using eigen paths having large path gain), and it is thereby possible to improve received data quality of signals requiring high quality.

Figure 3:
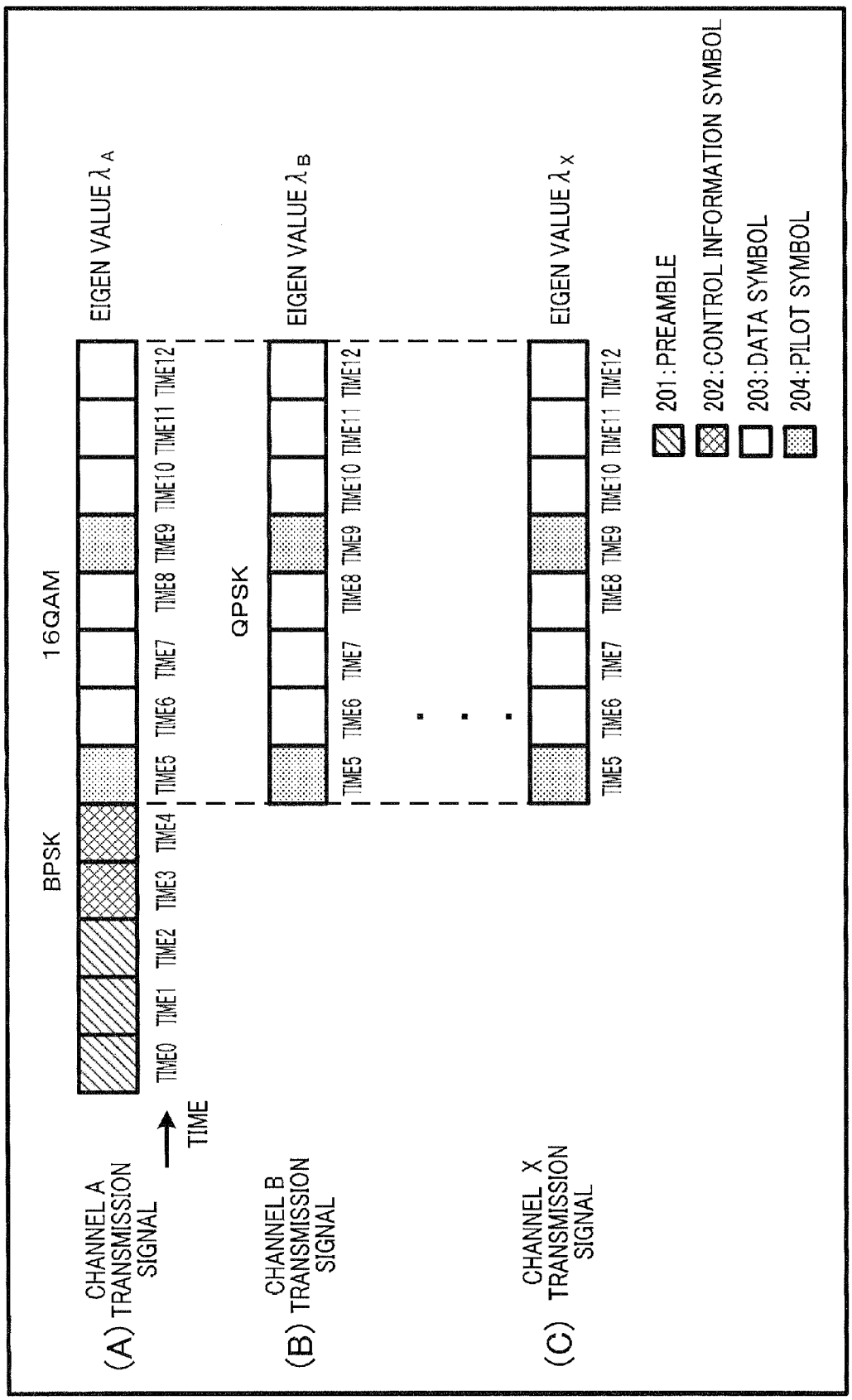
FIG. 3 illustrates the operation of the multi-antenna transmitting apparatus of Embodiment 1.

The operation of multi-antenna transmitting apparatus 100 will be specifically described using FIG. 3. In this embodiment, transmission signals requiring high quality compared to other signals are assumed to be a preamble and a control information symbol. Namely, a preamble is used to estimate channel condition and fluctuation in the amount of frequency offset due to a channel and time on the receiving side, and a control information symbol is used to report control information relating to protocol between transmitting and receiving equipments, such as a modulation scheme, coding rate and data transmission amount, to the receiving side. These signals are important signals for establishing communication and are therefore required to be accurately transmitted with high quality compared to other signals such as data symbols.

FIG. 3 shows a frame configuration of a signal transmitted from multi-antenna transmitting apparatus 100 (referred to hereafter as a base station). In FIG. 3, reference numeral 201 indicates a preamble, and multi-antenna receiving apparatus 200 (hereinafter referred to as a terminal) detects signals and estimates frequency offset utilizing this preamble. Reference numeral 202 indicates a control information symbol. The base station transmits information of a modulation scheme, coding rate and data transmission amount for each channel to the terminals using this symbol. Reference numeral 203 indicates a data symbol. Reference numeral 204 indicates a pilot symbol that is a known symbol. The terminal estimates the influence (channel condition) due to channel distortion of data symbols using this symbol.

Here, in this embodiment, eigen values $\lambda_A, \lambda_B, \lambda_C, \ldots, \lambda_X$ are assumed to have the relationship $\lambda_A > \lambda_B > \lambda_C > \ldots > \lambda_X$. At this time, as shown in FIG. 3(A), multi-antenna transmitting apparatus 100 transmits preamble 201 and control information symbol 202 using an eigen path (path A, that is, corresponding to channel A) for which the maximum eigen value A is obtained. In addition, as shown in FIGS. 3(B) and (C), a signal is not transmitted using the remaining eigen paths (paths B to X, that is, corresponding to channels B to X).

In this way, it is possible to transmit preamble 201 and control symbol 202 with high quality by ensuring that preamble 201 and control information symbol 202 that require high received data quality are transmitted using an eigen path having the largest path gain and ensuring that signals are not transmitted using other eigen paths.

Namely, during the period for time 0 to 4 in FIG. 3, signals are only transmitted from channel A, and signals are not transmitted using other channels B to X during this time. Therefore, the data transmission amount can be reduced correspondingly, but the number of symbols for preamble 201 and control information symbol 202 is extremely small compared to the number of symbols for the data symbols, and the data transmission rate slightly decreases. Considering the final data transmission rate, the effects of increasing a transmission rate by stabilizing the system as a result of enabling preamble 201 and control information symbol 202 to be transmitted with high quality are more substantial than the influence of decreasing a transmission rate by providing a period for transmitting only preamble 201 and control information symbol 202.

Further, as can be understood from FIG. 3, in this embodiment, data for channels with larger eigen values is modulated using a modulation scheme having a larger M-ary number. In the case of FIG. 3, eigen value $\lambda_A$ for channel A is larger than eigen value $\lambda_B$ for channel B. The data for channel B is therefore modulated using QPSK, and the data for channel A is modulated using 16QAM having a larger M-ary number. As a result, it is possible to transmit more data without deteriorating the error rate performance. Namely, channel A can be transmitted using an eigen path having large eigen value $\lambda_A$, and therefore errors are difficult to occur even if the M-ary number is made large. As a result, high speed data transmission is carried out for channel A using a modulation scheme having a large M-ary number. Compared with this, channel B is transmitted using an eigen path having smaller eigen value $\lambda_B$ than for channel A. Therefore, the error rate performance using the modulation scheme having the same M-ary number as channel A may deteriorate. Therefore, the modulation scheme having a smaller M-ary number than for channel A is used for channel B. As a result, it is possible to achieve both high-speed data transmission and high quality transmission.

According to this embodiment, when transmission signals requiring high quality compared to other signals are transmitted, a transmission beam is formed by reducing the number of transmission beams (that is, reducing the number of eigen paths used for transmission) and vector multiplexing the transmission signals preferentially using eigen vectors belonging to large eigen values (that is, signals requiring high quality are transmitted preferentially using eigen paths having large path gain), and it is thereby possible to implement multi-antenna transmitting apparatus 100 capable of improving both a data transmission rate and received data quality with comparatively simple selection procedure.

Further, by making the M-ary number of data transmitted using an eigen path having a large eigen value larger than the M-ary number of data transmitted using an eigen path having a small eigen value, it is also possible to improve both a data transmission rate and received data quality.

In this embodiment, the case has been described where the present invention is applied to single carrier communication, but the present invention is not limited to this, and the same effects can be obtained when the present invention is applied to OFDM and a spectrum spread communication scheme.

Figure 4:
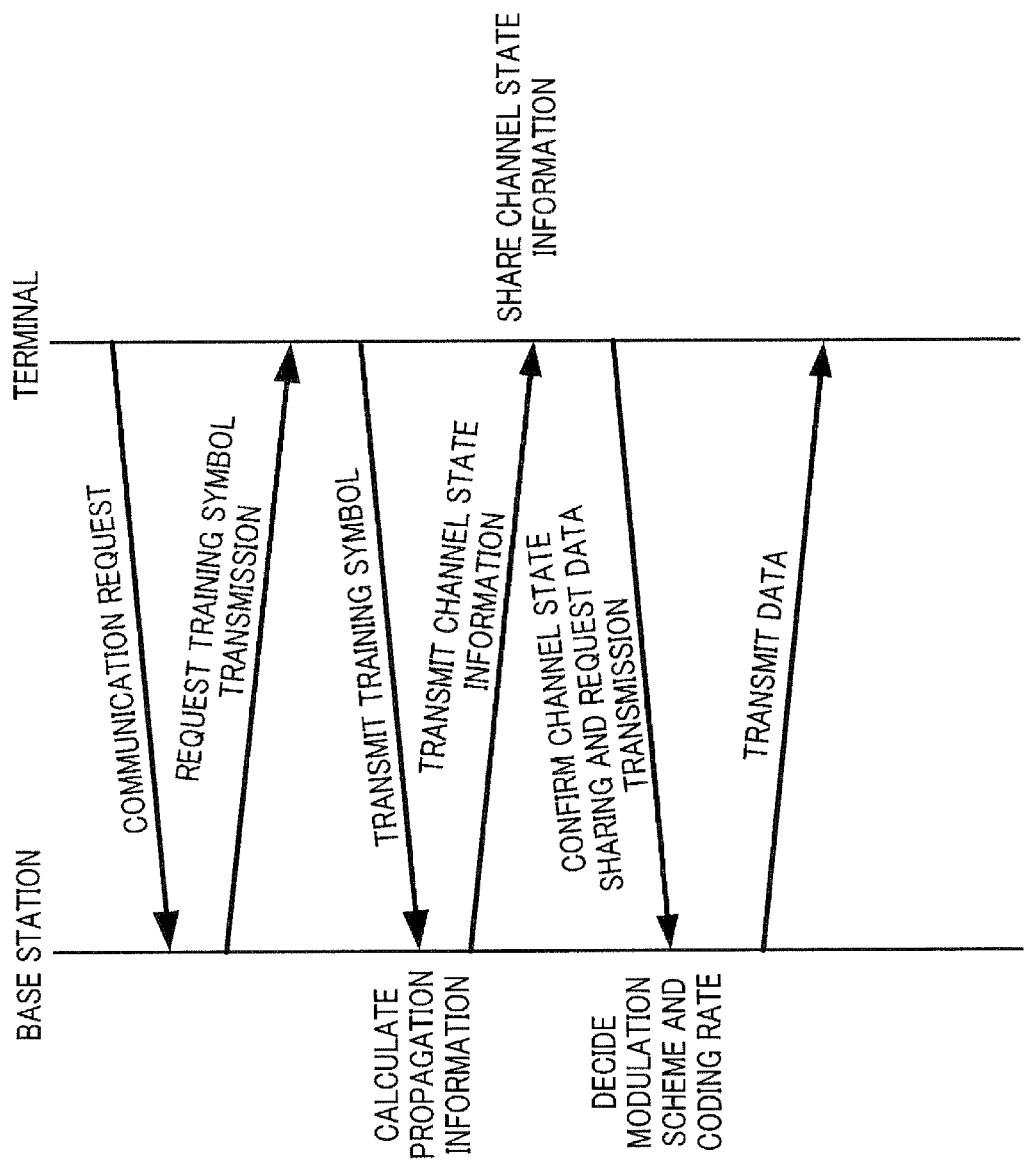
FIG. 4 shows a method for sharing channel state information on a transmitting side and a receiving side.

Finally, a method for sharing channel state information between multi-antenna transmitting apparatus 100 and multi-antenna receiving apparatus 200 is described for reference using FIG. 4.

<1> First, the terminal requests communication to the base station

<2> Next, the base station requests to the terminal transmission of a training symbol (for example, a known signal) for estimating channel information.

<3> The terminal transmits a training symbol.

<4> The base station estimates a channel state from the training symbol transmitted by the terminal.

<5> The base station transmits the estimated channel state information to the terminal.

<6> The terminal reports acquisition of channel state information and requests data transmission to the base station.

<7> The base station then decides a modulation scheme and coding rate for each beam (each channel) and transmits data to the terminal.

Channel state information can therefore be shared between the base station and the terminal by adopting the above-described method.

Embodiment 2

In this embodiment, a retransmission method capable of improving both a data transmission rate and received data quality using a comparatively simple procedure will be described.

A feature of this embodiment is that, when a retransmission signal is transmitted, a transmission beam is formed by reducing the number of transmission beams (that is, the number of eigen paths used for transmission is reduced) from the previous transmission and vector multiplexing the retransmission signal using an eigen vector belonging to a larger eigen value than the previous transmission (the retransmission signal is transmitted using an eigen path having larger path gain than the previous time).

Figure 5:
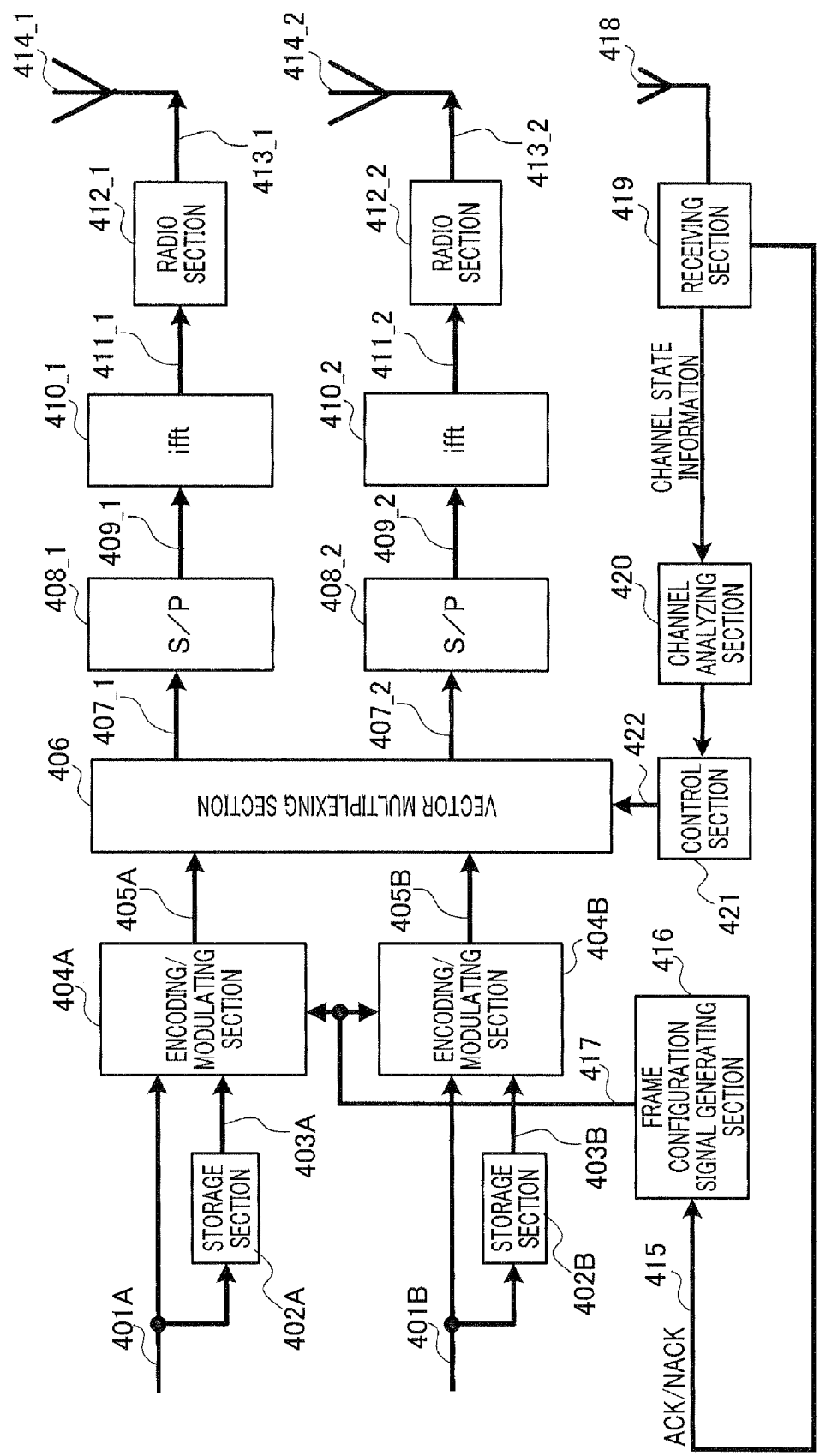
FIG. 5 is a block diagram showing a configuration of a multi-antenna transmitting apparatus of Embodiment 2.
Figure 6:
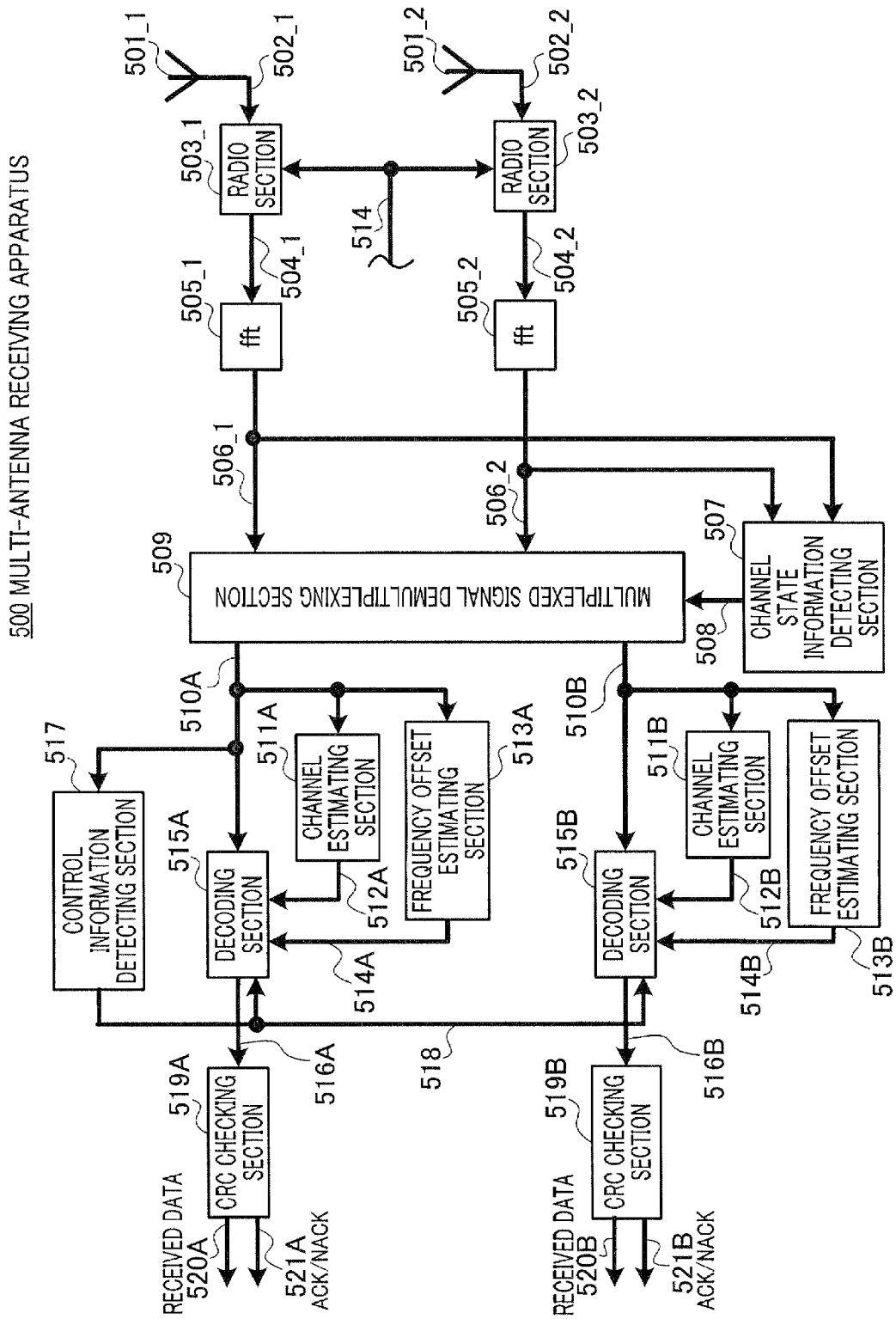
FIG. 6 is a block diagram showing a configuration of a multi-antenna receiving apparatus of Embodiment 2.

FIG. 5 shows the configuration of the multi-antenna transmitting apparatus of this embodiment. Further, FIG. 6 shows the configuration of the multi-antenna receiving apparatus of this embodiment. In this embodiment, the case will be described as an example where multi-antenna transmitting apparatus 400 is provided at a base station, and multi-antenna receiving apparatus 500 is provided at a terminal. Therefore, in the following description, multi-antenna transmitting apparatus 400 is referred to as a base station, and multi-antenna receiving apparatus 500 is referred to as a terminal.

Multi-antenna transmitting apparatus 400 inputs channel state information to channel analyzing section 420 via receive antenna 418 and receiving section 419. Further, ACK (Acknowledge)/NACK (Negative Acknowledge) signal 415 from the terminal is inputted to frame configuration section 416 via receive antenna 418 and receiving section 419.

As described above in FIG. 4, receiving section 419 estimates a channel state based on the training symbol transmitted by the terminal and outputs the estimation result as channel state information.

Channel analyzing section 420 obtains a channel matrix (space correlation matrix) between a plurality of transmit and receive antennas based on the channel state information which is the estimation result of channels between a plurality of transmit and receive antennas of multi-antenna transmitting apparatus 400 and multi-antenna receiving apparatus 500, and obtains eigen values for the channel matrix by analyzing a singular value of this channel matrix. Further, channel analyzing section 420 calculates channel signature vectors (in the case of this embodiment, eigen vectors) for the plurality of transmission channels based on the channel state information in order to configure multiplexed channels. Channel analyzing section 420 transmits the obtained eigen values and channel signature vectors (eigen vectors) to control section 421.

Control section 421 as a beam control section refers to the order of magnitude of the eigen values and forms control signal 422 for controlling vector multiplexing section 406. In reality, control section 421 transmits channel signature vectors (eigen vectors) for use in vector multiplexing as control signal 422.

Frame configuration signal generating section 416 generates frame configuration signal 417 for controlling a frame configuration based on information of ACK (Acknowledge)/NACK (Negative Acknowledge) signal 415 transmitted by the terminal and transmits this signal to encoding/modulating sections 404A and 404B. A frame configuration will be described in detail later using FIG. 8.

Further, multi-antenna transmitting apparatus 400 inputs digital transmission signal 401A for channel A and digital transmission signal 401B for channel B to encoding/modulating sections 404A and 404B and storage sections 402A and 402B. Storage sections 402A and 402B transmit stored digital transmission signals 403A and 403B to encoding/modulating sections 404A and 404B. Digital transmission signals 403A and 403B stored in storage sections 402A and 402B are then used as retransmission signals.

Encoding/modulating section 404A receives digital signal 401A for channel A, stored digital signal 403A for channel A, and frame configuration signal 417 as input, encodes and modulates either of digital signal 401A for channel A and stored digital signal 403A for channel A according to frame configuration signal 417, and transmits modulated signal 405A for channel A obtained in this way to vector multiplexing section 406. Similarly, encoding/modulating section 404B receives digital signal 401B for channel B, stored digital signal 403B for channel B, and frame configuration signal 417 as input, encodes and modulates either of digital signal 401B for channel B and stored digital signal 403B for channel B according to frame configuration signal 417, and transmits modulated signal 405B for channel B obtained in this way to vector multiplexing section 406.

Vector multiplexing section 406 vector multiplexes modulated signals 405A and 405B by multiplying and adding channel signature vectors with modulated signals 405A and 405B for channels A and B based on control information 422, and outputs vector multiplexed modulated signals #1 (407_1) and #2 (407_2).

Serial/parallel converting sections (S/P) 408_1 and 408_2 serial-parallel convert vector multiplexed modulated signals #1 (407_1) and #2 (407_2) to obtain parallel signals 409_1 and 409_2, and inverse Fourier transform sections (ifft) 410_1 and 410_2 perform inverse Fourier transform to obtain OFDM signals 411_1 and 411_2. Radio sections 412_1 and 412_2 perform predetermined radio processing such as frequency conversion on OFDM signals 411_1, 411_2 to obtain transmission signals #1 (413_1) and #2 (413_2), and transmission signals #1 (413_1) and #2 (413_2) are transmitted from antennas 414_1 and 414_2.

Multi-antenna receiving apparatus 500 of FIG. 6 inputs received signals #1 (502_1) and #2 (502_2) received at antennas 501_1 and 501_2 to radio sections 503_1 and 503_2. Radio sections 503_1 and 503_2 perform predetermined radio processing such as frequency conversion on received signals #1 (502_1) and #2 (502_2) to obtain baseband OFDM signals #1 (504_1) and #2 (504_2) and transmit these to Fourier transform sections (fft) 505_1 and 505_2.

Fourier transform sections 505_1 and 505_2 perform Fourier transform on baseband OFDM signals #1 (504_1) and #2 (504_2). Fourier transformed signals #1 (506_1) and #2 (506_2) are transmitted to multiplexed signal demultiplexing section 509 and channel state information detecting section 507.

Channel state information detecting section 507 detects channel state information from the base station inserted into Fourier transformed signals #1 (506_1) and #2 (506_2) when the procedure shown in FIG. 4 is taken, calculates a plurality of channel signature vectors 508 for demultiplexing multiplexed transmission signals and outputs these signals to multiplexed signal demultiplexing section 509.

Multiplexed signal demultiplexing section 509 obtains modulated signal 510A for channel A and modulated signal 510B for channel B by multiplying channel signature vectors with Fourier transformed signals #1 (506_1) and #2 (506_2) and transmits modulated signal 510A and modulated signal 510B to decoding sections 515A and 515B, channel estimating sections 511A and 511B, and frequency offset estimating sections 513A and 513B. Further, modulated signal 510A for channel A is transmitted to control information detecting section 517.

Control information detecting section 517 detects control information symbol 202 of FIG. 3 from modulated signal 510A for channel A and transmits control information 518 including information such as a modulation scheme and coding rate to decoding sections 515A and 515B.

Channel estimating sections 511A and 511B extract pilot symbols 204 for channels A and B in FIG. 3 from modulated signals 510A and 510B for channel A and B, estimate channel condition of the channels based on the pilot symbols, and transmit the estimation results to decoding sections 515A and 515B as channel condition estimation signals 512A and 512B for channels A and B.

Frequency offset estimating sections 513A and 513B extract preamble 201 and pilot symbols 204 of FIG. 3 from modulated signals 510A and 510B for channels A and B, estimate frequency offset of the channels based on these signals, and transmit the estimation results to decoding sections 515A and 515B as frequency offset estimating signals 514A and 514B. In the case of this embodiment, frequency offset estimating signals 514A and 514B are also transmitted to radio sections 503_1 and 503_2, and frequency offset removal is also carried out at radio sections 503_1 and 503_2.

After removing distortion components from modulated signals 510A and 510B based on channel condition estimating signals 512A and 512B and frequency offset estimating signals 514A and 514B, decoding sections 515A and 515B obtain digital signals 516A and 516B for channels A and B by demodulating and decoding modulated signals 510A and 510B based on information such as a modulation scheme and coding rate of control information 518. Digital signals 516A and 516B for channels A and B are then transmitted to CRC checking sections 519A and 519B.

Figure 7:
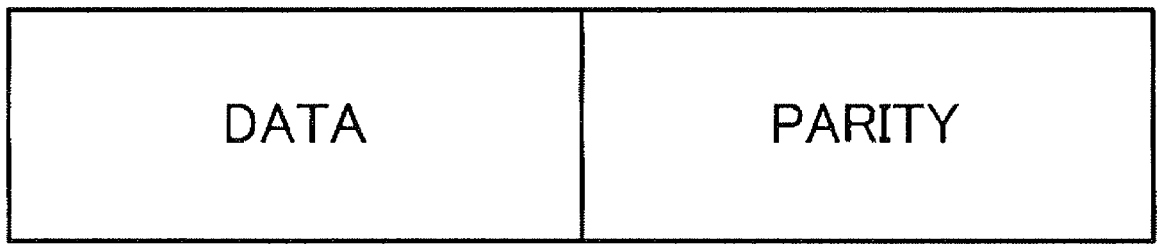
FIG. 7 shows a data configuration for carrying out CRC check.

CRC checking sections 519A and 519B carry out CRC check for digital signals 516A and 516B. As shown in FIG. 7, digital signals 516A and 516B for channels A and B are configured with data and parity. CRC checking sections 519A and 519B are therefore able to check whether or not errors occur by checking the digital signals configured in this way. CRC checking sections 519A and 513B output ACK/NACK signals 521A and 521B together with received data 520A and 520B.

Next, retransmission operation (ARQ (Automatic Repeat Request)) performed by multi-antenna transmitting apparatus 400 of this embodiment will be described.

Figure 8:
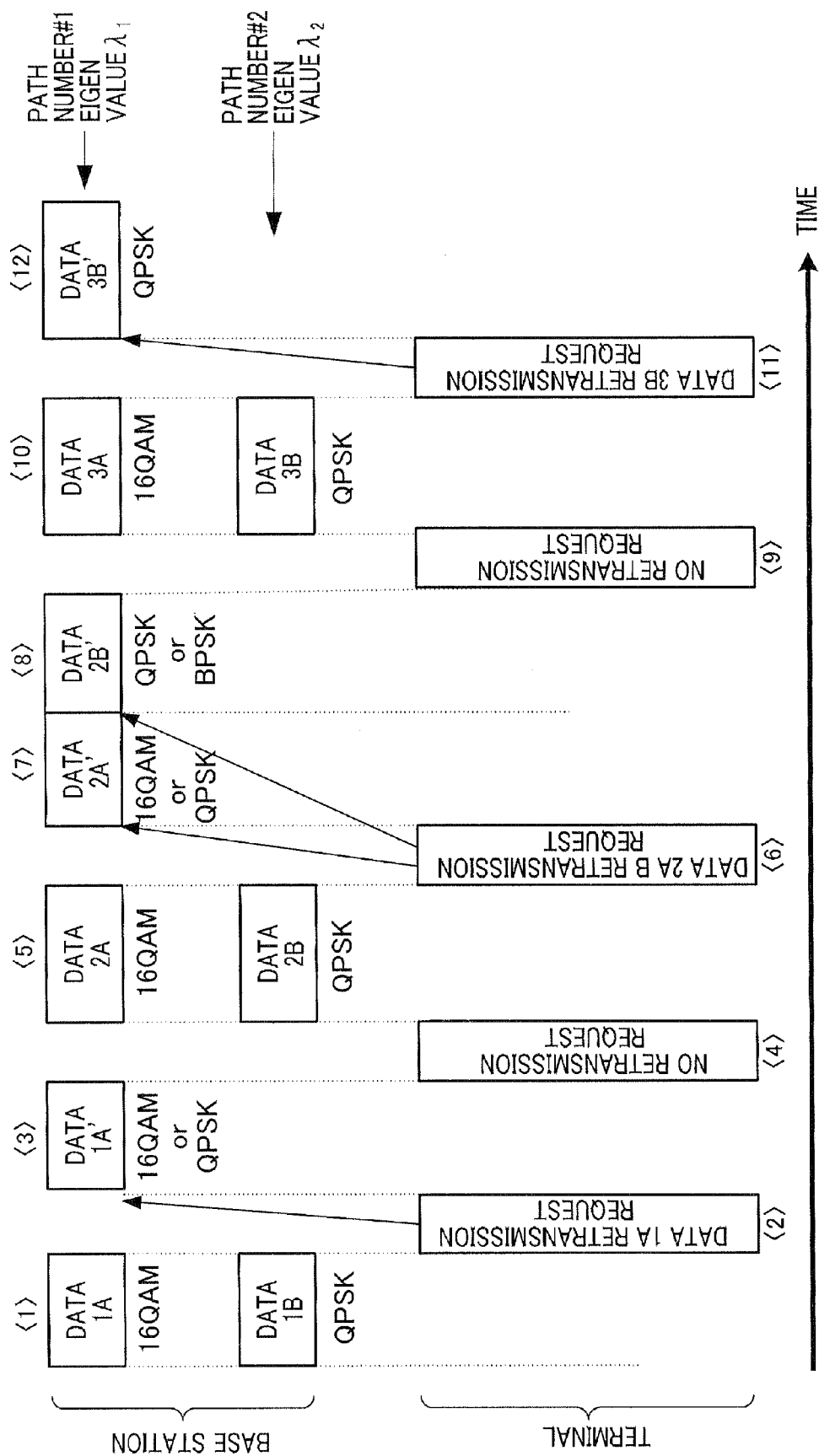
FIG. 8 illustrates an ARQ method of Embodiment 2.

FIG. 8 shows an example of exchange of data between the base station (multi-antenna transmitting apparatus 400) and the terminal (multi-antenna receiving apparatus 500) in order to illustrate the ARQ method of this embodiment. It is assumed as a condition here that eigen value $\lambda 1$ for path #1 is larger than eigen value $\lambda 2$ for path #2. Further, the modulation scheme for data that is not retransmitted is taken to be 16QAM when path #1 is used, and QPSK when path #2 is used.

<1> First, the base station transmits data 1A for channel A using path #1 and data 1B for channel B using path #2.

<2> The terminal requests retransmission of data 1A to the base station because errors occur in data 1A.

<3> The base station transmits data 1A' corresponding to retransmission data of data 1A for channel A using path #1.

<4> The terminal does not request retransmission because there is no error in data 1A.

<5> The base station transmits data 2A for channel A using path #1 and data 2B for channel B using path #2.

<6> The terminal requests retransmission of data 2A and data 2B to the base station because errors occur in data 2A and data 2B.

<7><8> The base station transmits data 2A' corresponding to retransmission data of data 2A for channel A and data 2B' corresponding to retransmission data of data 2B for channel B using path #1.

<9> The terminal does not request retransmission because there is no error in data 2A and data 2B.

<10> The base station transmits data 3A for channel A using path #1 and data 3B for channel B using path #2.

<11> The terminal requests retransmission of data 3B to the base station because errors occur in data 3B.

<12> The base station transmits data 3B' corresponding to retransmission data of data 3B for channel B using path #1.

Retransmission data (for example, data 1A') may be the same data as the original data (for example, data 1A), or may be restorable data (for example, punctured data).

The following two points are important in the above-described processing.

The first point is that the number of paths is reduced upon retransmission. In the example in FIG. 8, the number of paths is two upon data transmission, and the number of paths is one upon retransmission. As a result, the number of paths is reduced upon retransmission, that is, interference is reduced, and data received quality is therefore improved. As a result, it is possible to reduce the number of retransmission times and improve data throughput.

The second point is to retransmit the retransmission data preferentially using a path having a larger eigen value than the previous transmission. When the second point is considered in combination with the above-described first point, by preferentially deleting paths having a small eigen value when reducing the number of paths, it can be said that retransmission data is retransmitted using paths having large eigen values. As a result, retransmission data is transmitted using paths having large eigen values, that is, paths having large path gain, and data received quality is therefore improved. As a result, it is possible to reduce the number of retransmission times and improve data throughput.

When the modulation scheme is made the same for the original data and the retransmission data, the configuration of the transmitting apparatus can be made simple. Namely, in FIG. 8, it is assumed that, for example, the modulation scheme for data 1A and retransmission data 1A' for channel A is the same, and that the modulation scheme for data 2B and retransmission data 2B' for channel B is the same. In this embodiment, upon retransmission, the number of paths is reduced, and the retransmission signals are retransmitted using eigen paths having larger eigen values than the previous transmission, so that it is possible to expect sufficient improvement of error rate performance even though M-ary number is not made small upon retransmission. In this way, by making the modulation scheme for the original data and the retransmission data the same, it is no longer necessary to perform encoding and interleaving again in order to generate the retransmission data at the transmitting apparatus, so that it is possible to simplify the configuration of the transmitting apparatus.

When priority is given to improving data quality rather than to simplifying the configuration of the transmitting apparatus, it is better to reduce an M-ary number of retransmission data.

In FIG. 8, an ARQ method of the present invention has been described using the example of the case where the number of transmit antennas is two, but it is also possible to apply the ARQ method of the present invention to cases where the number of transmit antennas is three or more. In the following, an ARQ method for the case where the number of transmit antennas is three and three modulated signals are transmitted will be described using the example in FIG. 9 and FIG. 10.

Figure 9:
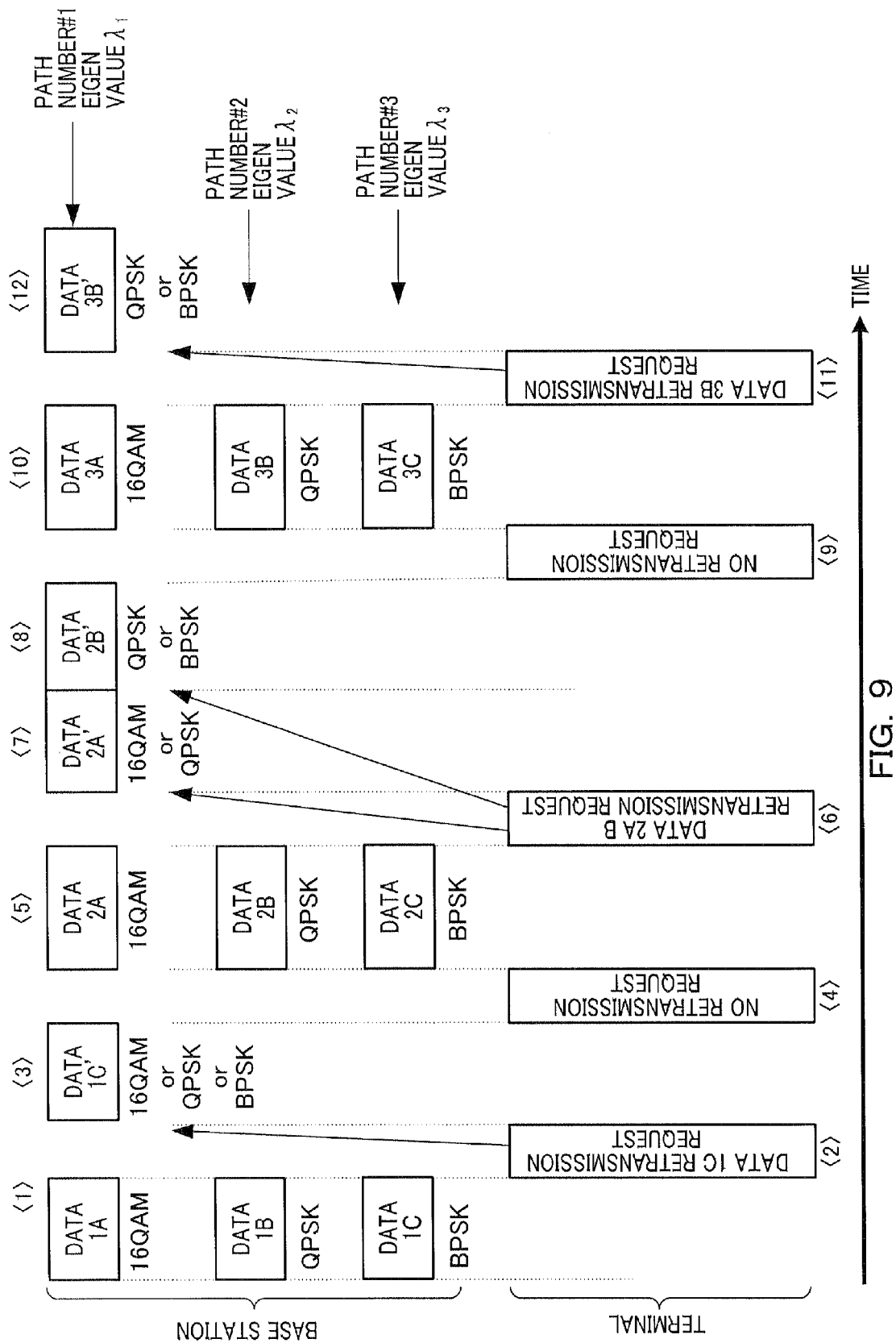
FIG. 9 further illustrates the ARQ method of Embodiment 2.

First, the exchange of data between the base station and the terminal in FIG. 9 will be described in detail. In FIG. 9, it is assumed that eigen value $\lambda_1$ for path #1, eigen value $\lambda_2$ for path #2, and eigen value $\lambda_3$ for path #3 have the relationship $\lambda_1 > \lambda_2 > \lambda_3$. Further, the modulation scheme for data that is not retransmitted is assumed to be 16QAM when path #1 is used, QPSK when path #2 is used, and BPSK when path #3 is used.

<1> First, the base station transmits data 1A for channel A using path #1, data 1B for channel B using path #2, and data 1C for channel C using path #3.

<2> The terminal requests retransmission of data 1C to the base station because errors occur in data 1C.

<3> The base station transmits data 1C' corresponding to retransmission data of data 1C for channel C using path #1.

<4> The terminal does not request retransmission because there is no error in data 1C.

<5> The base station transmits data 2A for channel A using path #1, data 2B for channel B using path #2, and data 2C for channel C using path #3.

<6> The terminal requests retransmission of data 2A and data 2B to the base station because errors occur in data 2A and data 2B.

<7> <8> The base station transmits data 2A' corresponding to retransmission data of data 2A for channel A and data 2B' corresponding to retransmission data of data 2B for channel B using path #1.

<9> The terminal does not request retransmission because there is no error in data 2A and data 2B.

<10> The base station transmits data 3A for channel A using path #1, data 3B for channel B using path #2, and data 3C for channel C using path #3.

<11> The terminal requests retransmission of data 3B to the base station because errors occur in data 3B.

<12> The base station transmits data 3B' corresponding to retransmission data of data 3B for channel B using path #1.

Figure 10:
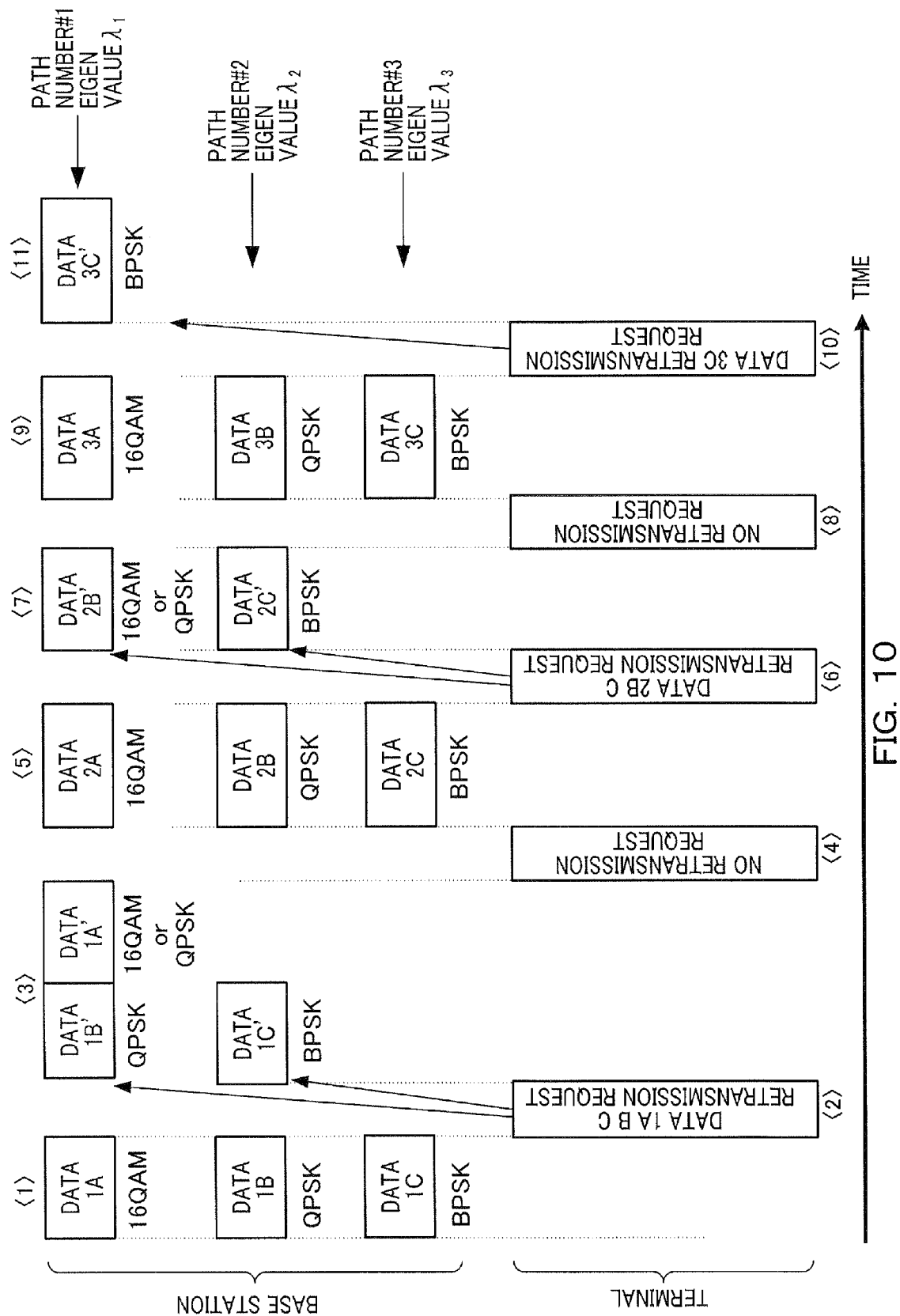
FIG. 10 still further illustrates the ARQ method of Embodiment 2.
Figure 12:
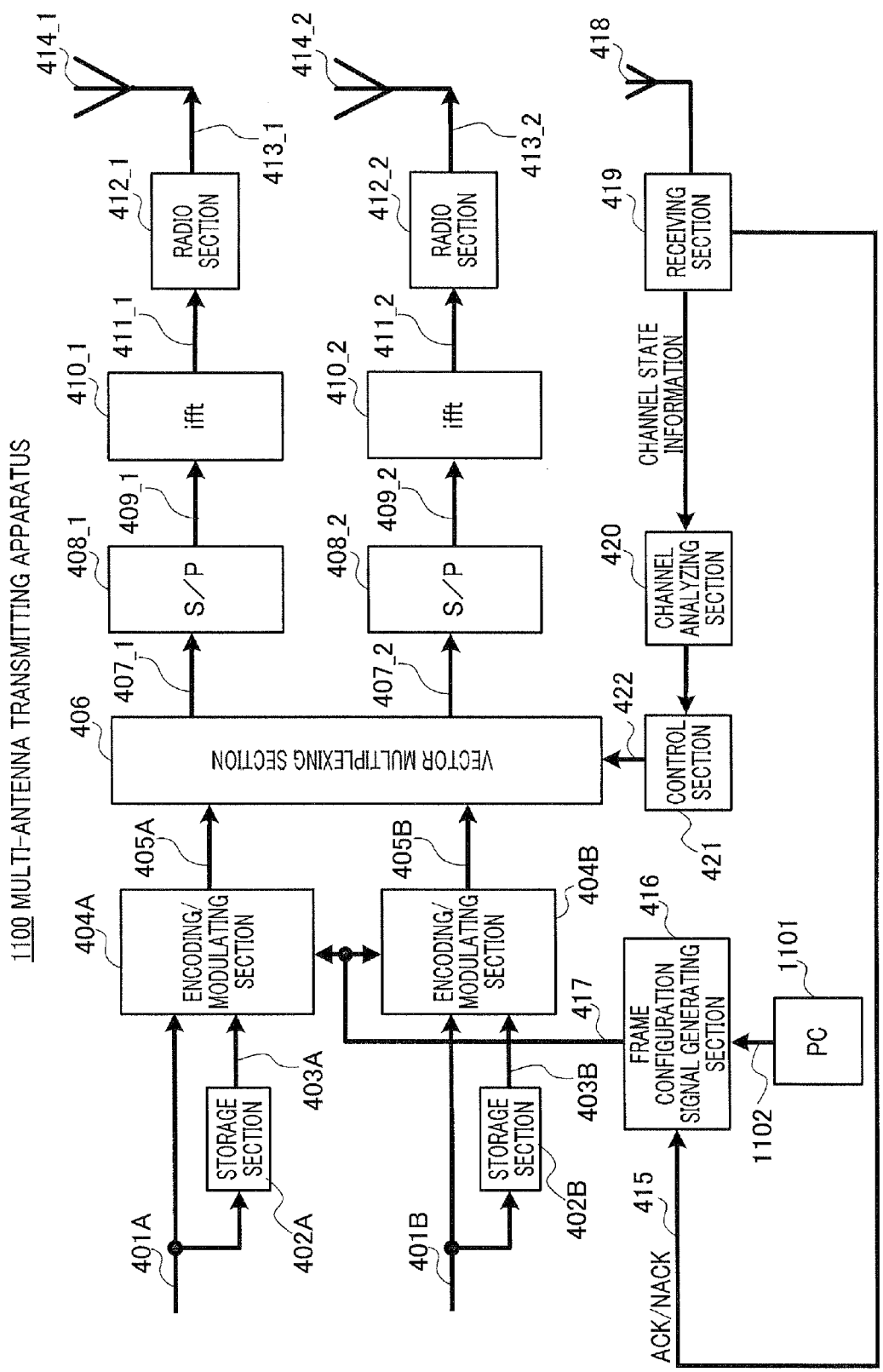
FIG. 12 is a block diagram showing a configuration of a multi-antenna transmitting apparatus of Embodiment 3.

Next, the exchange of data between the base station and the terminal in FIG. 10 will be described in detail. In FIG. 10, as in the case of FIG. 9, it is assumed that eigen value $\lambda_1$ for path #1, eigen value $\lambda_2$ for path #2, and eigen value $\lambda_3$ for path #3 have the relationship $\lambda_1 > \lambda_2 > \lambda_3$. Further, the modulation scheme for data that is not retransmitted is assumed to be 16QAM when path #1 is used, QPSK when path #2 is used, and BPSK when path #3 is used.

<1> First, the base station transmits data 1A for channel A using path #1, data 1B for channel B using path #2, and data 1C for channel C using path #3.

<2> The terminal requests retransmission of data 1A, data 1B and data 1C to the base station because errors occur in data 1A, data 1B and data 1C.

<3> The base station first transmits data 1B' corresponding to retransmission data of data 1B for channel B using path #1 and data 1C' corresponding to retransmission data of data 1C for channel C using path #2. Next, the base station transmits data 1A' corresponding to retransmission data of data 1A for channel A using path #1. At this time, other modulated signals are not present on path 2#.

<4> The terminal does not request retransmission because there is no error in data 1A, 1B and 1C.

<5> The base station transmits data 2A for channel A using path #1, data 2B for channel B using path #2, and data 2C for channel C using path #3.

<6> The terminal requests retransmission of data 2B and data 2C to the base station because errors occur in data 2B and data 2C.

<7> The base station then transmits data 2B' corresponding to retransmission data of data 2B for channel B using path #1 and data 2C' corresponding to retransmission data of data 2C for channel C using path #2.

<8> The terminal does not request retransmission because there is no error in data 2B and data 2C.

<9> The base station transmits data 3A for channel A using path #1, data 3B for channel B using path #2, and data 3C for channel C using path #3.

<10> The terminal requests retransmission of data 3C to the base station because errors occur in data 3C.

<11> The base station transmits data 3C' corresponding to retransmission data of data 3C for channel C using path #1.

A feature of the ARQ method described in FIG. 9 is that the retransmission data is transmitted using an eigen path having a maximum eigen value. Further, during transmission of retransmission data, signals are not transmitted on other eigen paths. As a result, the quality of retransmission data becomes higher than when the data is transmitted (that is, upon normal transmission), so that it is possible to reduce the number of retransmission times. It is therefore possible to improve data throughput.

Further, a feature of the ARQ method described in FIG. 10 is as described in the following.

The number of paths to be used is reduced upon retransmission.

Paths having large path gain are preferentially used upon retransmission.

The retransmission of data other than data transmitted using a path having maximum gain upon the previous transmission is carried out using a path having a larger path gain than the previous transmission.

The retransmission of data transmitted using a path having maximum gain upon the previous transmission is carried out independently without using other paths in addition to again using the path having maximum gain.

By this means, the quality of the retransmission data can be improved compared to the previous transmission, so that it is possible to reduce the number of retransmission times. It is therefore possible to improve data throughput. Further, by transmitting retransmission data using a path having larger path gain than the previous transmission, quality upon retransmission can be improved, and retransmission data can be transmitted using a plurality of paths (for example, <3> and <7> of FIG. 10), so that it is possible to achieve a high speed transmission rate for retransmission data compared to the ARQ method of FIG. 9.

According to this embodiment, when a retransmission signal is transmitted, a transmission beam is formed by reducing the number of transmission beams (that is, reducing the number of eigen paths used for transmission) from the previous transmission and vector multiplexing the retransmission signal using an eigen vector belonging to a larger eigen value than the previous transmission (transmitting using an eigen path having larger path gain than the previous time), and it is thereby possible to reduce the number of retransmission times using a comparatively simple selection procedure and improve data throughput.

In this embodiment, the frame configuration of FIG. 3 is used for explanation for convenience, but this embodiment describes the example of using the OFDM scheme, and the symbols of FIG. 3 are therefore symbols configured using a plurality of subcarriers.

Further, in this embodiment, the case has been described where the present invention is applied to an OFDM scheme, but the present invention is by no means limited to this, and the same effects can also be obtained for the case where the present invention is applied to a spectrum spread communication scheme and a single carrier scheme.

Further, in this embodiment, the way of sharing channel state information has not been described in detail, but the sharing of channel state information may be carried out upon retransmission or may not be carried out upon retransmission. Namely, the way of sharing channel state information does not influence the features of this embodiment.

Further, in this embodiment, a modulation scheme is particularly described as a parameter for a transmission method, but retransmission may also be carried out taking into consideration parameters such as a coding method and coding rate other than a modulation scheme, and the present invention can be implemented in the same way even when these parameters are added.

Embodiment 3

In this embodiment, a preferred method for deciding and setting a modulation scheme for implementing transmission methods such as Embodiments 1 and 2 will be described.

In this embodiment, a case will be described as an example where the number of antennas for the base station is two and two modulated signals are transmitted.

The case is considered of adopting a communication method capable of changing between BPSK, QPSK, 16QAM and 64QAM as a modulation scheme. Further, channels transmitting on paths having a large eigen value are referred to as channel A, and channels transmitting on paths having a small eigen value are referred to as channel B (excluding the case of transmitting retransmission data). At this time, when the case is considered for all the combinations of transmission channels and modulation schemes, it is possible to create a modulation scheme setting table as shown in FIG. 11. FIG. 11 is assumed to show transmission methods that are supported as specification.

For example, setting #2 and setting #5, and setting #3 and setting #9 of FIG. 11 have the same transmission rate. When two or more types of transmission methods having the same transmission rate exist, or the number of transmission methods which can be selected increases as shown in FIG. 11 (that is, all combinations are provided), there is a problem that decision of the transmission method becomes complicated.

Therefore, in this embodiment, a method of limiting selection of modulation schemes to the methods suitable for the user's demand from the transmission methods that are supported in the specification using, for example, personal computer, will be described.

FIG. 2 where the portions corresponding to FIG. 5 will be assigned the same reference numerals, shows a configuration of the multi-antenna transmitting apparatus of this embodiment. Personal computer (PC) 1101 transmits transmission method setting information 1102 to frame configuration signal generating section 416. Frame configuration signal generating section 416 limits the transmission method based on transmission method setting information 1102.

Figure 13:
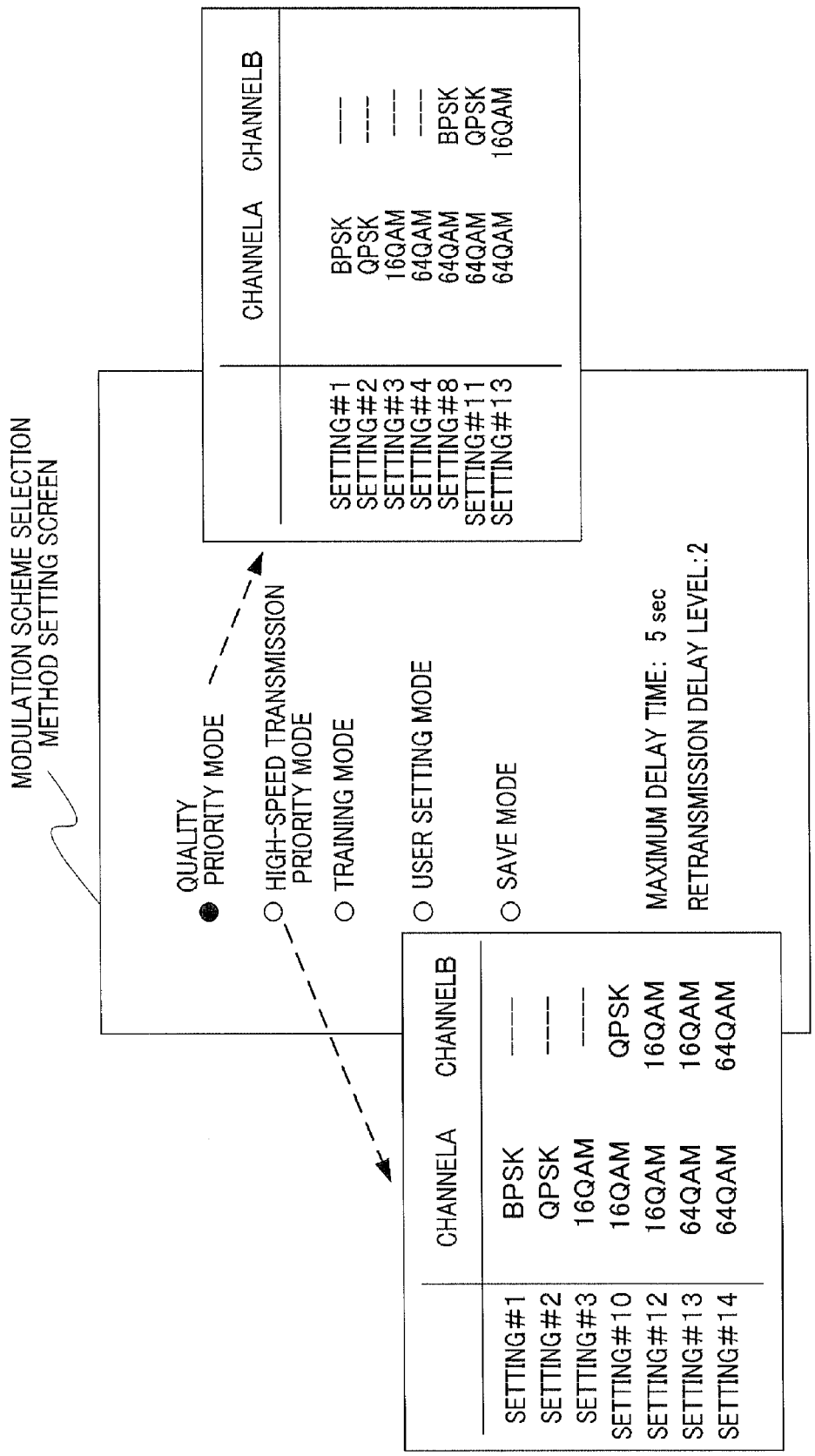
FIG. 13 shows a setting screen for a modulation scheme selection method of Embodiment 3.

FIG. 13 shows an example of a screen for setting a transmission method using PC1101. The important points here are that it is possible to select a quality priority mode and a high-speed transmission priority mode and that it is possible to set a maximum delay time.

The reasons why these are important in this system will be described in detail in the following.

A system is considered where it is possible to perform transmission at, for example, 500 kbits/second by performing transmission using BPSK in only one channel. Upon transmission of data of 50 kbits, it is assumed that there is an environment where data can be transmitted using setting #14 of FIG. 11 when a propagation environment is considered. It is then assumed that data is transmitted using setting #14. However, when data is transmitted using setting #14, errors are more likely to occur, retransmission is likely to be requested, and transmission time for retransmission is spent. Therefore, data transmission time is reduced more as a result when data is transmitted using the transmission method of setting #1 of FIG. 11.

This kind of situation occurs when the data amount is extremely small with respect to a data transmission rate. Due to this problem, it is important to have a function for carrying out the following setting from outside (for example, using a PC). (Method 1) Making a setting such as a quality priority mode and a high-speed transmission priority mode possible. (Method 2) Making a setting of a maximum delay time possible.

In FIG. 11, data quality is better for the case of only transmitting a signal for one channel compared to the case of transmitting a signal for two channels. Here, when a configuration capable of performing setting as in (method 1) is adopted and the user mainly utilizes the multi-antenna transmitting apparatus in order to transmit data having a small capacity, a quality priority mode is selected, and, when the user mainly utilizes the multi-antenna transmitting apparatus in order to transmit data having a large capacity, a high-speed data transmission mode is selected. By this means, it is possible to avoid the above problem. At this time, as shown in FIG. 13, the quality priority mode becomes as shown in a table configured centered on settings #1 to #4, and the high-speed transmission priority mode becomes as shown in a table configured centered on setting #5 to setting #14. In the quality priority mode, a transmission method of transmitting only signals for one channel is preferentially assigned.

Figure 14:
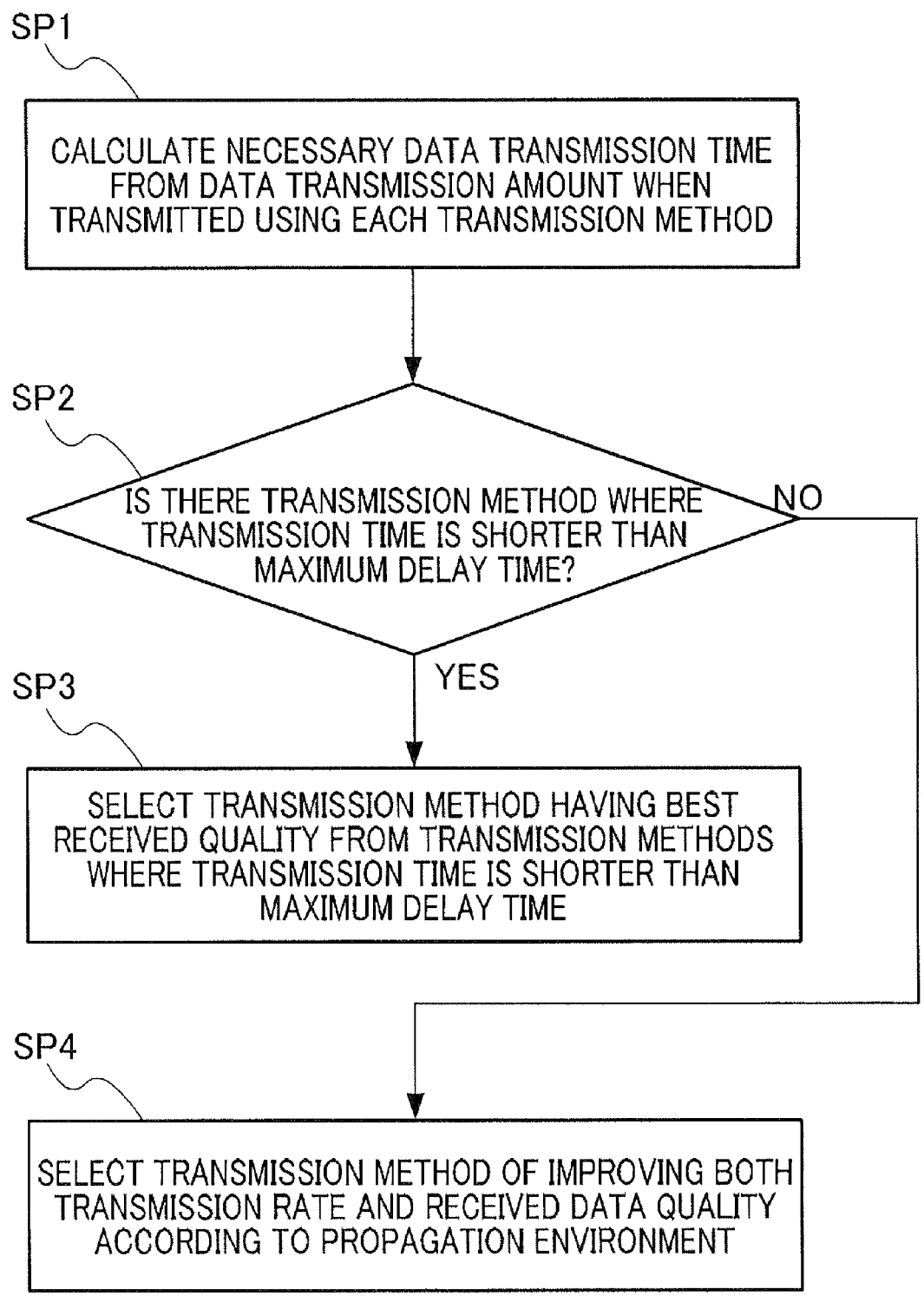
FIG. 14 is a flowchart showing a deciding procedure for selecting a modulation scheme of Embodiment 3.

At this time, the important role is the setting of a maximum delay time. A maximum delay time is a maximum delay time allowed by the user. At this time, a transmission method is decided as shown in FIG. 14.

First, in step SP1, the time required for transmission for the case of performing transmission using the transmission methods in the table (for example, the table shown in FIG. 13) is calculated from the transmission amount of the data to be transmitted.

Next, in step SP2, it is determined whether or not a transmission method where the time required for transmission is less than a maximum delay time exists in the table.

When a transmission method where the time required for transmission is less than a maximum delay time does not exist in the table, the flow shifts to step SP4, and a transmission method of improving both a transmission rate and received data quality is selected according to the propagation environment, or the like.

On the other hand, when a transmission method where the time required for transmission is less than a maximum delay time does exist, the flow shifts to step SP3, and a transmission method with the best received quality is selected from the transmission methods where the time required for transmission is less than a maximum delay time.

As described above, by selecting a transmission method based on a maximum delay time, the transmission method having the excessive transmission rate may not be selected when the data amount is small, so that it is possible to construct a system where a data transmission rate and received data quality are stable.

A training mode, user setting mode, and save mode are also provided as effective modes in the system in addition to the quality priority mode and the high-speed transmission priority mode.

Figure 15:
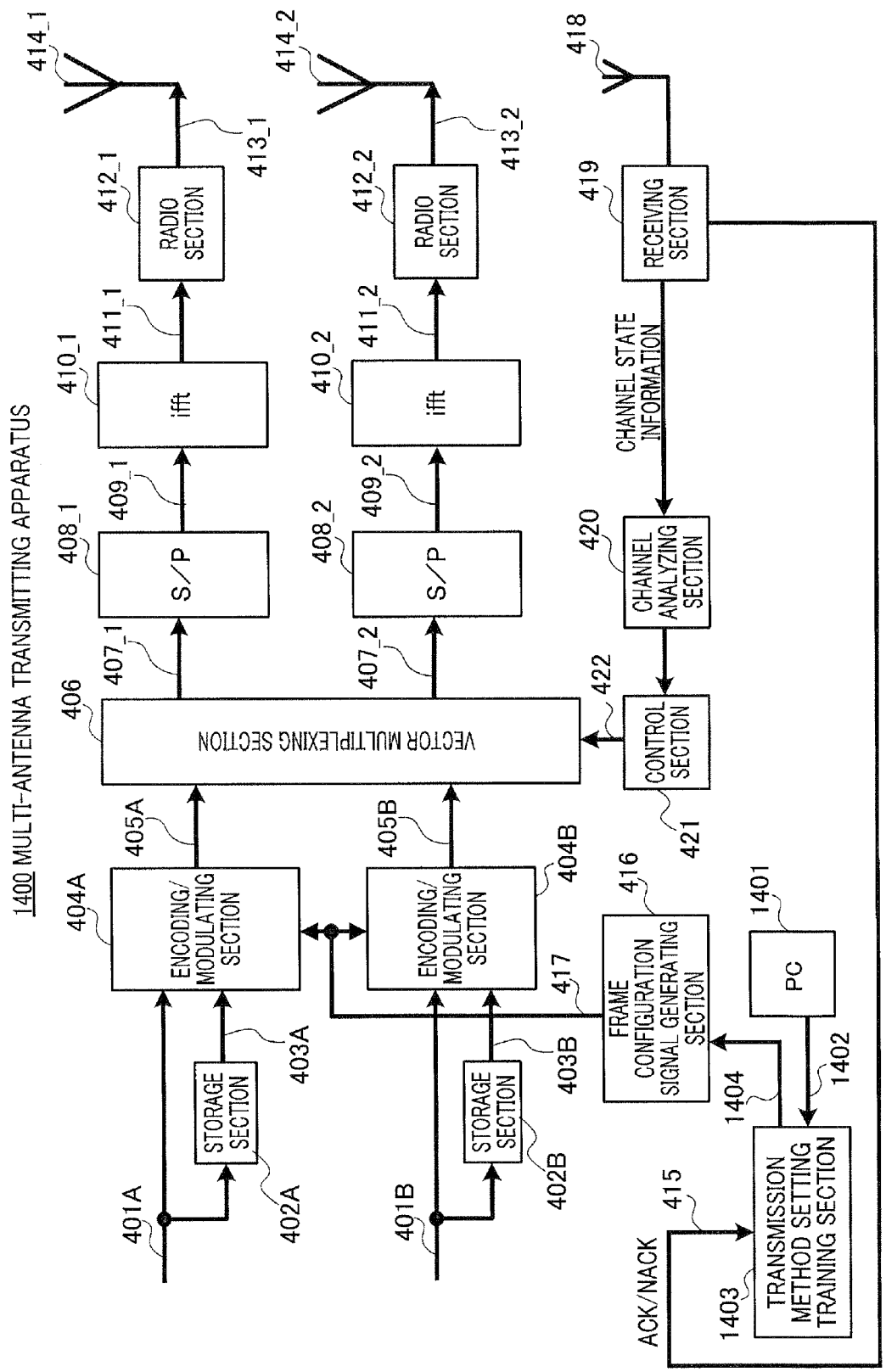
FIG. 15 is a block diagram showing a further configuration of the multi-antenna transmitting apparatus of Embodiment 3.

When there are a training mode and user setting mode, it is possible to adopt a configuration as shown in FIG. 15. In FIG. 15, components that operate in the same way as FIG. 5 will be assigned the same reference numerals. Personal computer (PC) 1401 of multi-antenna transmitting apparatus 1400 also transmits mode setting information 1402 to transmission method setting/training section 1403. Transmission method setting/training section 1403 sets a setting mode based on mode setting information 1402, decides a transmission method from ACK/NACK based on the setting mode method, and transmits this to frame configuration signal generating section 416 as transmission method deciding information 1404.

Frame configuration signal generating section 416 refers to transmission method deciding information 1404 and outputs frame configuration signal 417 that is information relating to a frame configuration based on the decided transmission method.

At this time, in the case of, for example, cellular base stations and wireless LAN access points, when a setting of the training mode is created by training the transmission method table, there is a benefit that decision of a transmission method can be simplified.

Cellular base stations and wireless LAN access points rarely move. The propagation environment therefore depends largely on the installed location. It is therefore possible to simplify decision of a transmission method by training a transmission method where communication can be likely to be established and creating a table. Here, a method of setting a training mode is effective.

In the training mode, for example, in the table of FIG. 11, at setting #1 to setting #14, respectively, for example, statistics for the number of times of NACK and the number to times of ACK are taken, methods are deleted from the table in the order from transmission methods where the NACK is more likely to be received, and the type of transmission method is limited. As a result, it is possible to simplify decision of a transmission method. When a configuration is adopted where resetting is possible from PC1401 or from outside, and, when the location is moved, it is possible to train and remake a table suitable for the moved location by resetting and retraining.

A user setting mode is a method where the user makes a table by limiting the type of a transmission method. As a result, it is possible to simplify decision of a transmission method. Further, a method is also possible where software in a chart of a table is downloaded from outside, acquired, and setting is carried out.

Figure 16:
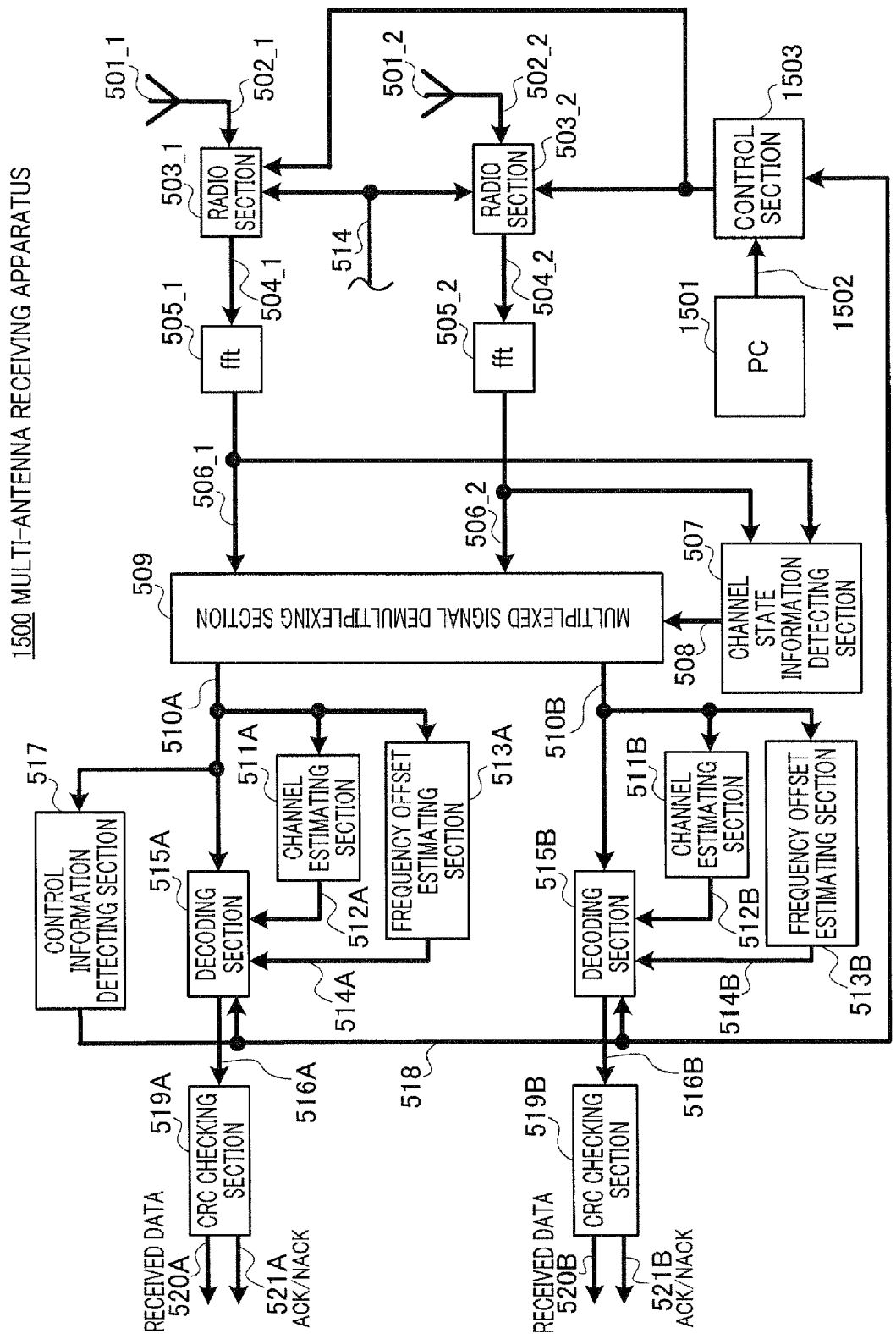
FIG. 16 is a block diagram showing another configuration of the multi-antenna transmitting apparatus of Embodiment 3.

Next, the save mode will be described. This is a mode for setting a receiving apparatus of a terminal. A configuration example of multi-antenna receiving apparatus 1500 for a terminal for implementing setting of the save mode is shown in FIG. 16 where portions corresponding to those of FIG. 6 will be assigned the same reference numerals.

Multi-antenna receiving apparatus 1500 sets a mode using personal computer (PC) 150, and transmits this to control section 1503 as mode setting information 1502. Control section 1503 receives mode setting information 1502 and control information 518 including information such as a modulation scheme and coding rate as input, is set in the safe mode, and, when control information 518 indicates a transmission method where a modulated signal for only one channel exists, outputs control signal 1504 so as to stop the operation of one of radio sections 503_1 and 503_2.

As a result, it is possible to reduce power consumed by the receiving apparatus of the terminal. Here, the operation of only a radio section is stopped, but this is by no means limiting, and the same effects can also be obtained by stopping the operation of a portion where digital signal processing is being carried out.

As described above, it is possible to simplify transmitting and receiving equipments, reduce the power consumption and improve both a data transmission rate and received quality by limiting the transmission method and setting a training mode or a safe mode based on information from outside. In particular, when a transmission method using MIMO transmission is included, these effects are substantial.

By applying the above-described switching of transmission methods upon retransmission in the same way, it is possible to obtain the same effects as described above.

Next, a method of creating the table as shown in FIG. 17 which is different from the table of FIG. 13 will be described. In FIG. 17, it is possible to set an application mode at a screen of a personal computer. For example, a user can select any mode from "moving picture mode", "Internet mode," "file download mode," "game mode," "training mode" and "user setting mode." When modes other than "training mode" and "user setting mode" are selected, a transmission mode, maximum delay time, and retransmission delay time are set automatically, and, when "training mode" and "user setting mode" are selected, the user can set a maximum delay time and a retransmission delay time. When a table is created, and a mode is set using a personal computer, the same effects can be obtained as for the embodiments described above.

In this embodiment, a modulation scheme is particularly described as a parameter for a transmission method, but a transmission method table may also be created taking into consideration parameters such as a coding method and a coding rate other than a modulation scheme, and the present invention can be implemented in the same way even when these parameters are added.

A feature of this embodiment can be applied not only to eigenmode MIMO systems, but also to a MIMO multiplexing scheme utilizing, for example, an antenna element mode. In the following, a MIMO multiplexing scheme utilizing the antenna element mode will be described for reference.

Figure 18:
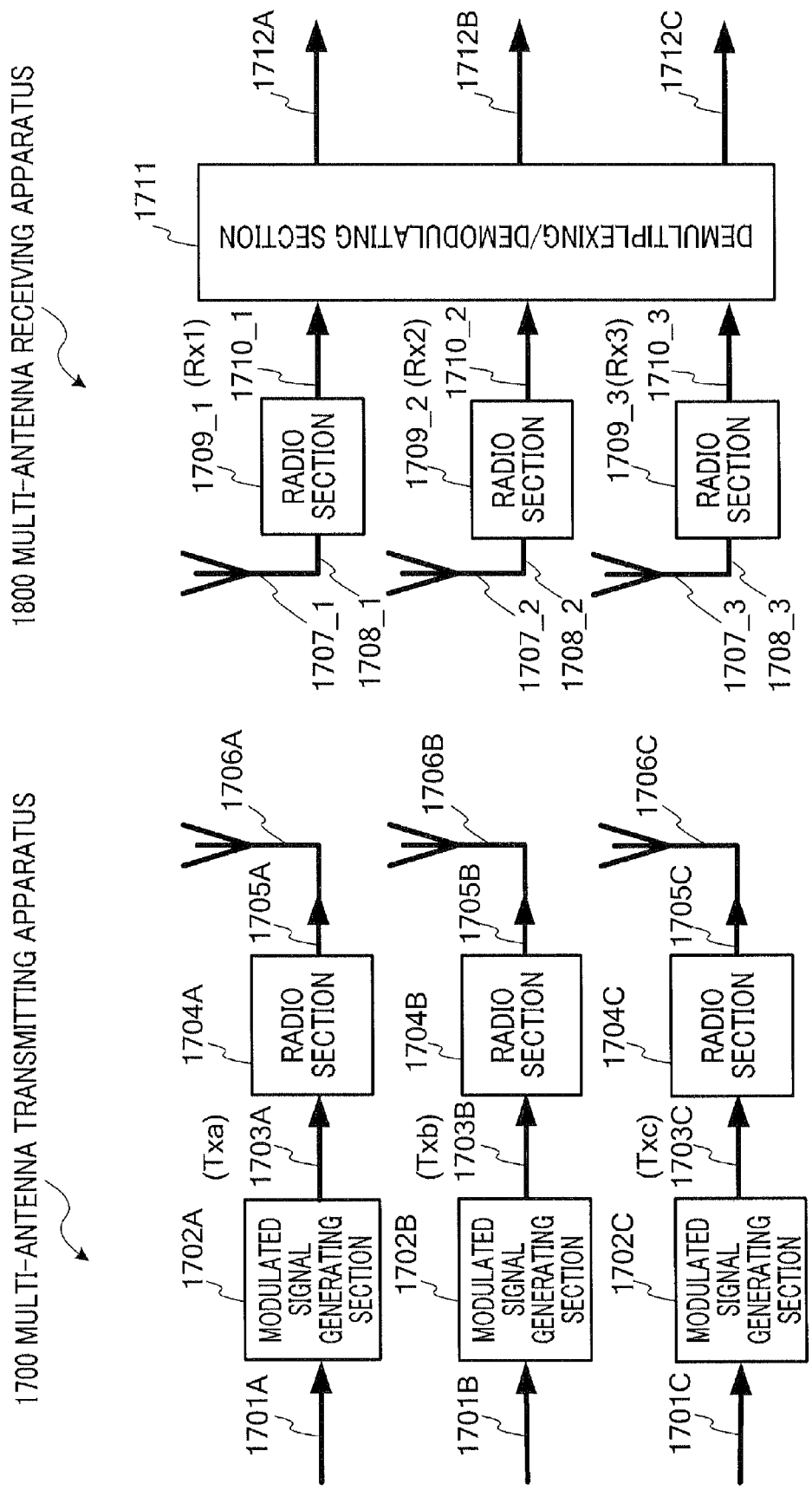
FIG. 18 is a block diagram showing a configuration of the multi-antenna transmitting apparatus and the multi-antenna receiving apparatus for implementing a MIMO multiplexing method utilizing an antenna element mode.

FIG. 18 shows a configuration example of the multi-antenna transmitting apparatus and multi-antenna receiving apparatus for implementing a MIMO multiplexing scheme utilizing the antenna element mode.

Multi-antenna transmitting apparatus 1700 inputs digital signals 1701A, 1701B and 1701C for channels A, B and C to modulated signal generating sections 1702A, 1702B and 1702C, and obtains modulated signals 1703A, 1703B and 1703C for channels A, B and C by modulating the inputs. Radio sections 1704A, 1704B and 1704C then obtain transmission signals 1705A, 1705B and 1705C by performing predetermined radio processing such as frequency conversion on modulated signals 1703A, 1703B and 1703C for channels A, B and C and supply transmission signals 1705A, 1705B and 1705C to antennas 1706A, 1706B and 1706C.

Multi-antenna receiving apparatus 1800 inputs received signals 1708_1, 1708_2, and 1708_3 received by antennas 1707_1, 1707_2 and 1707_3 to radio sections 1709_1, 1709_2 and 1709_3. Radio sections 1709_1, 1709_2 and 1709_3 perform predetermined radio processing such as frequency conversion on received signals 1708_1, 1708_2 and 1708_3 so as to obtain baseband signals 1710_1, 1710_2 and 1710_3 and transmits the results to demultiplexing/demodulating section 1711.

Demultiplexing/demodulating section 1711 demultiplexes transmitted original modulated signals 1703A, 1703B and 1703C from baseband signal 1710_1, baseband signal 1710_2 and baseband signal 1710_3, and obtains digital received signals 1712A, 1712B and 1712C for channels A, B and C by demodulating these signals.

Here, when modulated signal 1703A for channel A, modulated signal 1703B for channel B, and modulated signal 1703C for channel C are Txa(t), Txb(t) and Txc(t), respectively, and baseband signal 1710_1, baseband signal 1710_2 and baseband signal 1710_3 are Rx1($t$), Rx2($t$) and Rx3($t$), respectively, the following relational expression is satisfied. Here, h11($t$) to h33($t$) are channel condition values between transmit and receive antennas.

(Equation 1)

$$\begin{pmatrix} Rx1(t) \\ Rx2(t) \\ Rx3(t) \end{pmatrix} = \begin{pmatrix} h11(t) & h12(t) & h13(t) \\ h21(t) & h22(t) & h23(t) \\ h31(t) & h32(t) & h33(t) \end{pmatrix} \begin{pmatrix} Txa(t) \\ Txb(t) \\ Txc(t) \end{pmatrix} \quad [1]$$

Namely, demultiplexing/demodulating section 1711 demultiplexes signals for channel A, channel B and channel C based on the relational expression of equation 1.

It is also possible for modulated signals Txa(t) Txb(t) and Txc(t) to be taken as independent modulation schemes. By doing so, as described in this embodiment, the number of types of transmission methods increases, and the transmission method selection method becomes complicated. However, it is possible to simplify the selection procedure for the transmission method by applying the processing described in this embodiment to this kind of MIMO multiplexing scheme.

The present application is based on Japanese patent application No. 2005-8304, filed on Jan. 14, 2005, the entire of which is expressly incorporated by reference herein.

INDUSTRIAL APPLICABILITY

The present invention is suitable for application to a multi-antenna transmitting apparatus and a retransmission method thereof used in multi-antenna communication systems such as MIMO systems and OFDM-MIMO systems.

The invention claimed is:

1. A communication method in a multi-antenna communication apparatus for determining transmission parameters using information obtained by communicating a known symbol between the multi-antenna communication apparatus and one communicating party, the method comprising:
    a modulation signal generation step of outputting a first transmission modulation signal obtained by modulating first transmission data and outputting a second transmission modulation signal obtained by modulating second transmission data;
    a transmission step of, in a common frequency band, using weights determined based on the number of all transmission beams that can be transmitted from multiple antennas, generating a first transmission beam from the first transmission modulation signal and a first eigenvector belonging to a maximum eigenvalue amongst eigenvalues determined per transmission beam, generating a second transmission beam from the second transmission modulation signal and a second eigenvector different from the first eigenvector and transmitting a plurality of transmission signals obtained by combining the first transmission beam and the second transmission beam from the multiple antennas to the one communicating party, the eigenvalues being determined per transmission beam based on the information obtained by the communication of the known symbol;
    a retransmission request signal reception step of receiving a signal requesting a retransmission of at least part of the transmission data;
    a retransmission modulation signal generation step of, when the data requested for the retransmission includes the first transmission data and the second transmission data, generating a first retransmission modulation signal by modulating first retransmission data, the first retransmission data comprising a bit sequence that at least in part differs from a bit sequence of the first transmission data, and generating a second retransmission modulation signal by modulating second retransmission data, the second retransmission data comprising a bit sequence that at least in part differs from a bit sequence of the second transmission data; and
    a retransmission step of, using weights determined based on the information obtained by the communication of the known symbol, and a number of transmission beams lower than upon a previous transmission, generating the first transmission beam from the first retransmission modulation signal, generating one of the first transmission beam from the second retransmission modulation signal at a different time from the first retransmission modulation signal and a third transmission beam that is different from the second transmission beam from the second retransmission modulation signal, and transmitting the generated transmission beams to the one communicating party.

2. The method of claim 1, wherein:
    the multi-antenna communication apparatus further transmits a control information symbol; and
    the control information symbol is transmitted using one transmission beam, based on the information obtained by communication of the known symbol.

3. The method of claim 1, wherein the first retransmission data comprises data generated by puncturing the first transmission data, and the second retransmission data comprises data generated by puncturing the second transmission data.

4. The method of claim 1, wherein the first retransmission modulation signal adopts a different modulation scheme from a modulation scheme of the first transmission modulation signal, and the second retransmission modulation signal adopts a different modulation scheme from a modulation scheme of the second transmission modulation signal.

5. A multi-antenna communication apparatus comprising:
a receiving section that receives a signal requesting a retransmission of information obtained by communication of a known symbol with one communicating party, or part of data that has been transmitted;
a modulation section that outputs a first transmission modulation signal obtained by modulating first transmission data and a second transmission modulation signal obtained by modulating second transmission data, and that, when the data requested for the retransmission includes the first transmission data and the second transmission data, generates a first retransmission modulation signal by modulating first retransmission data, the first retransmission data comprising a bit sequence that at least in part differs from a bit sequence of the first transmission data, and generates a second retransmission modulation signal by modulating second retransmission data, the second retransmission data comprising a bit sequence that at least in part differs from a bit sequence of the second transmission data;
a vector multiplexing section that, using weights determined based on the number of all transmission beams that can be transmitted from multiple antennas, generates a first transmission beam from the first transmission modulation signal and a first eigenvector belonging to a maximum eigenvalue amongst eigenvalues determined per transmission beam, generates a second transmission beam from the second transmission modulation signal and a second eigenvector different from the first eigenvector, and that, when the data requested for the retransmission includes the first transmission data and the second transmission data, using weights determined based on the information obtained by the communication of the known symbol, and a number of transmission beams lower than upon a previous transmission, generates the first transmission beam from the first retransmission modulation signal at a first time, and generates one of the first transmission beam from the second retransmission modulation signal at a second time that is different time from the first time and a third transmission beam that is different from the second transmission beam from the second retransmission modulation signal at the first time; and
a transmission section that transmits a plurality of transmission signals obtained by combining the first transmission beam and the second transmission beam from the multiple antennas to the one communicating party in a common frequency band; and that, when the data requested for the retransmission includes the first transmission data and the second transmission data, transmits the first transmission beam generated from the first retransmission modulation signal and the third transmission beam generated from the second retransmission modulation signal at the first time, and first transmission beam generated from the second retransmission modulation signal at a second time, from the multiple antennas to the one communicating party in the common frequency band.

6. The apparatus of claim 5, wherein the first retransmission modulation signal adopts a different modulation scheme from a modulation scheme of the first transmission modulation signal, and the second retransmission modulation signal adopts a different modulation scheme from a modulation scheme of the second transmission modulation signal.

* * * * *